(12) United States Patent
Han

(10) Patent No.: US 9,912,209 B2
(45) Date of Patent: Mar. 6, 2018

(54) RENEWABLE ENERGY MARINE HYDROKINETIC OR WIND TURBINE

(71) Applicant: Differential Dynamics Corporation, Owings Mills, MD (US)

(72) Inventor: Kyung Soo Han, Timonium, MD (US)

(73) Assignee: Differential Dynamics Corporation, Owings Mills, MD (US)

( * ) Notice: Subject to any disclaimer, the term of this patent is extended or adjusted under 35 U.S.C. 154(b) by 0 days.

(21) Appl. No.: 15/267,655

(22) Filed: Sep. 16, 2016

(65) Prior Publication Data
US 2017/0030326 A1    Feb. 2, 2017

Related U.S. Application Data

(60) Continuation-in-part of application No. 14/838,867, filed on Aug. 28, 2015, now Pat. No. 9,476,401, (Continued)

(51) Int. Cl.
*F03B 13/00* (2006.01)
*F03B 13/10* (2006.01)
(Continued)

(52) U.S. Cl.
CPC ............ *H02K 7/116* (2013.01); *F03B 13/264* (2013.01); *F03B 15/08* (2013.01); *F03B 15/12* (2013.01);
(Continued)

(58) Field of Classification Search
USPC ........... 290/43; 318/400.09; 475/149; 476/4, 476/37
See application file for complete search history.

(56) References Cited

U.S. PATENT DOCUMENTS 3,619,746 A * 11/1971 Thornton .................. H02P 6/14
318/400.01
7,081,689 B2   7/2006 Tilscher et al.
(Continued)

FOREIGN PATENT DOCUMENTS

WO    WO1992/14298    8/1992
WO    WO2011/011358    1/2011

*Primary Examiner* — Pedro J Cuevas
(74) *Attorney, Agent, or Firm* — Cameron LLP

(57) ABSTRACT

Three controls, three variable gear assemblies, a hatch, and a variable torque and power generator (VT&PG), may be used independently and together to provide constant frequency and voltage output power and to increase the amount of output power generated with the same input water flow or wind speed. A three variable spur/helical gear assembly of sun and planetary gear sets is a mechanical three variable control and referred to herein as a Transgear™ gear assembly, simply Transgear. A hatch wraps around a waterwheel and may control the amount of water inlet to the system by opening and closing and may be controlled by Transgears and a VT&PG. Two Transgears may comprise a constant speed motor control and produce required frequency and voltage and be reduced in part count and complexity. The VT&PG of a marine hydrokinetic or wind power generator may be used as a low torque generator and a high power-rated generator in these applications and may generate more electric power than a conventional fixed power generator (the rotor axially aligned to overlap the stator in a conventional manner) over a wider input range.

20 Claims, 24 Drawing Sheets

MHK Turbine with Hatch Control and Fine Control

Related U.S. Application Data which is a continuation-in-part of application No. 14/829,354, filed on Aug. 18, 2015, now Pat. No. 9,490,736, and a continuation-in-part of application No. 14/255,377, filed on Apr. 17, 2014, now Pat. No. 9,151,269, which is a continuation-in-part of application No. 13/915,785, filed on Jun. 12, 2013, now Pat. No. 8,702,552, which is a division of application No. 13/568,288, filed on Aug. 7, 2012, now Pat. No. 8,485,933, which is a continuation-in-part of application No. 13/425,501, filed on Mar. 21, 2012, now Pat. No. 8,641,570, which is a continuation-in-part of application No. 13/384,621, filed as application No. PCT/US2010/002519 on Jul. 20, 2010, now Pat. No. 8,388,481.

(60) Provisional application No. 62/039,096, filed on Aug. 19, 2014, provisional application No. 61/521,408, filed on Aug. 9, 2011, provisional application No. 61/523,846, filed on Aug. 16, 2011.

(51) Int. Cl.

| | | |
|---|---|---|
| *H02P 9/04* | (2006.01) | |
| *H02K 7/116* | (2006.01) | |
| *F03D 15/00* | (2016.01) | |
| *H02K 7/18* | (2006.01) | |
| *F03B 13/26* | (2006.01) | |
| *F03B 15/08* | (2006.01) | |
| *F03B 15/12* | (2006.01) | |
| *F03B 17/06* | (2006.01) | |
| *F03D 3/04* | (2006.01) | |
| *F03D 3/00* | (2006.01) | |
| *H02P 1/04* | (2006.01) | |
| *F16H 48/06* | (2006.01) | |

(52) U.S. Cl.

CPC ............ *F03B 17/063* (2013.01); *F03D 3/002* (2013.01); *F03D 3/0436* (2013.01); *F03D 15/00* (2016.05); *H02K 7/183* (2013.01); *F05B 2210/11* (2013.01); *F05B 2210/12* (2013.01); *F05B 2210/16* (2013.01); *F05B 2220/32* (2013.01); *F05B 2220/706* (2013.01); *F05B 2240/93* (2013.01); *F05B 2240/97* (2013.01); *F05B 2260/404* (2013.01); *F05B 2260/40311* (2013.01); *F05B 2270/101* (2013.01); *F05B 2270/32* (2013.01); *Y02E 10/28* (2013.01); *Y02E 10/74* (2013.01); *Y10T 74/18056* (2015.01); *Y10T 74/2101* (2015.01)

(56) References Cited

U.S. PATENT DOCUMENTS

| | | | | |
|---|---|---|---|---|
| 7,166,056 B2* | | 1/2007 | Miller | B62M 9/08 476/37 |
| 7,632,203 B2* | | 12/2009 | Miller | B60K 6/26 475/149 |
| 7,727,101 B2* | | 6/2010 | Miller | B60K 6/26 475/149 |
| 7,828,685 B2* | | 11/2010 | Miller | B60K 6/26 310/112 |
| 8,070,635 B2* | | 12/2011 | Miller | B60K 6/26 475/5 |
| 8,133,149 B2 | | 3/2012 | Smithson et al. | |
| 8,342,999 B2* | | 1/2013 | Miller | B60K 6/26 310/83 |
| 8,388,481 B2 | | 5/2013 | Han | |
| 8,485,933 B2 | | 7/2013 | Han | |
| 8,550,949 B2* | | 10/2013 | Miller | B60K 6/26 475/149 |
| 8,641,570 B2 | | 2/2014 | Han | |
| 8,702,552 B2 | | 4/2014 | Han | |
| 8,816,620 B2* | | 8/2014 | Pricop | H02P 25/08 318/400.09 |
| 9,022,889 B2* | | 5/2015 | Miller | B60K 6/26 475/149 |
| 9,476,401 B2* | | 10/2016 | Han | F03B 13/264 |
| 9,490,736 B2* | | 11/2016 | Han | H02P 9/02 |
| 9,506,562 B2* | | 11/2016 | Miller | B60K 6/26 |
| 2005/0119090 A1* | | 6/2005 | Miller | B62M 9/08 476/37 |
| 2007/0082779 A1* | | 4/2007 | Han | F16H 3/721 475/325 |
| 2007/0142161 A1* | | 6/2007 | Miller | B60K 6/26 476/4 |
| 2008/0146403 A1* | | 6/2008 | Miller | B60K 6/26 476/4 |
| 2008/0146404 A1* | | 6/2008 | Miller | B60K 6/26 476/4 |
| 2008/0161151 A1* | | 7/2008 | Miller | B60K 6/26 476/4 |
| 2009/0041584 A1 | | 2/2009 | Gray et al. | |
| 2010/0237626 A1 | | 9/2010 | Hamner | |
| 2012/0043841 A1* | | 2/2012 | Miller | B60K 6/26 310/83 |
| 2012/0115662 A1* | | 5/2012 | Han | H02P 9/04 475/31 |
| 2012/0211990 A1 | | 8/2012 | Davey et al. | |
| 2013/0106258 A1* | | 5/2013 | Miller | B60K 6/26 310/75 R |
| 2013/0239566 A1 | | 9/2013 | Kim et al. | |
| 2014/0038771 A1* | | 2/2014 | Miller | B60K 6/26 476/11 |
| 2014/0042941 A1* | | 2/2014 | Pricop | H02P 25/08 318/400.09 |
| 2015/0233473 A1* | | 8/2015 | Miller | F16H 61/6649 475/5 |
| 2015/0357951 A1* | | 12/2015 | Han | H02P 9/02 290/43 |
| 2016/0010620 A1* | | 1/2016 | Han | F03B 13/264 290/43 |
| 2017/0072782 A1* | | 3/2017 | Miller | B60K 6/26 |

* cited by examiner

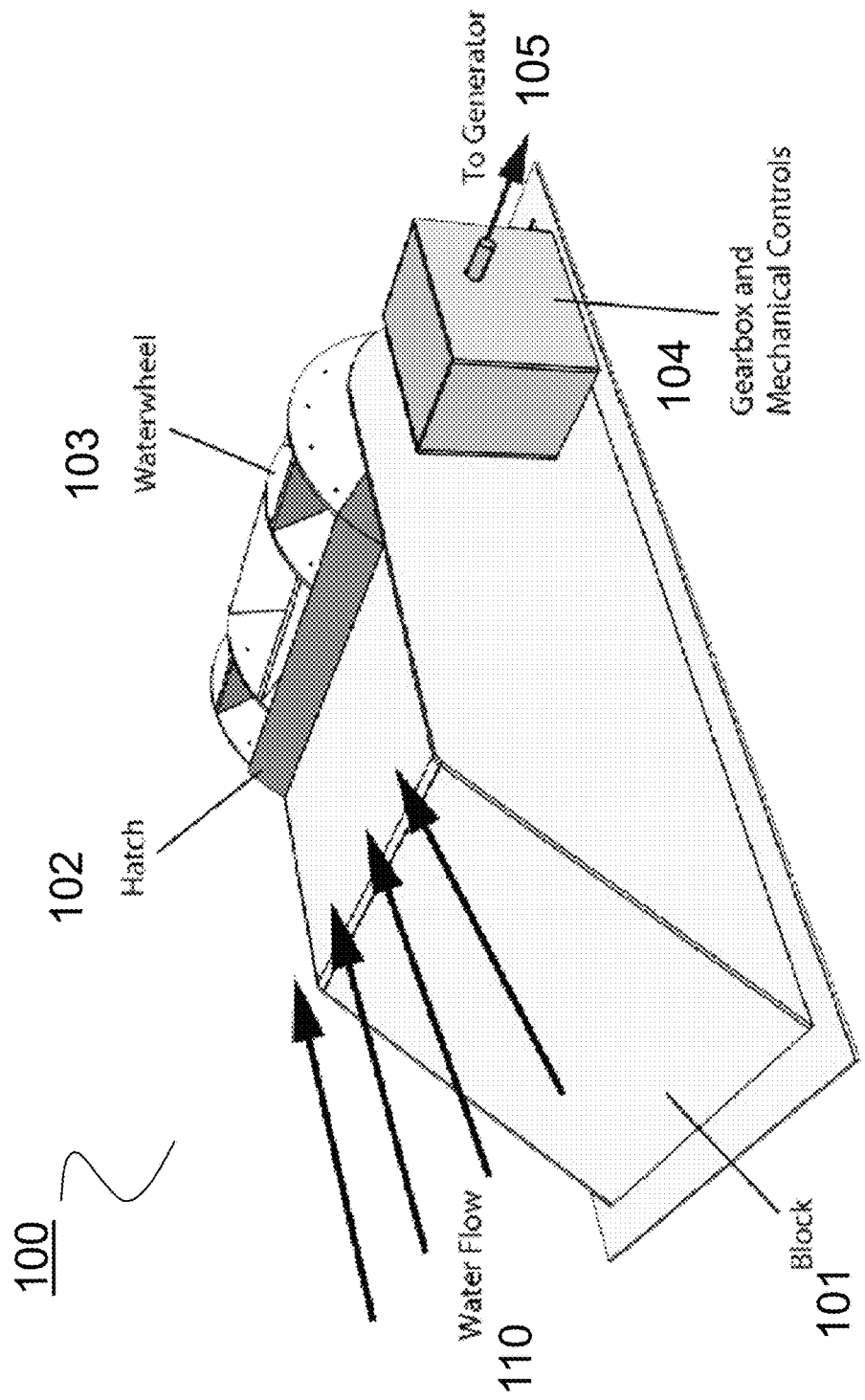
Figure 1. Perspective View of a River Turbine

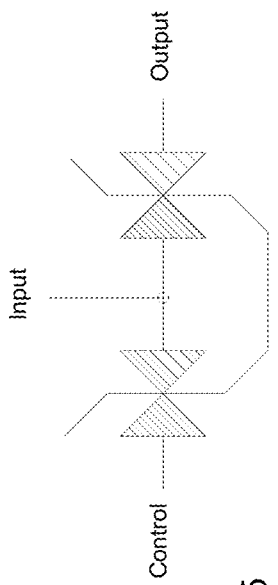
Figure 2A. River Turbine
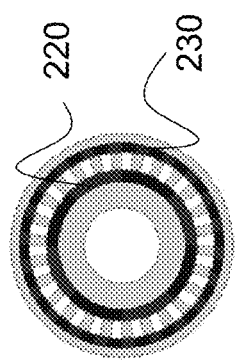
Figure 2B. Magnetic Gear
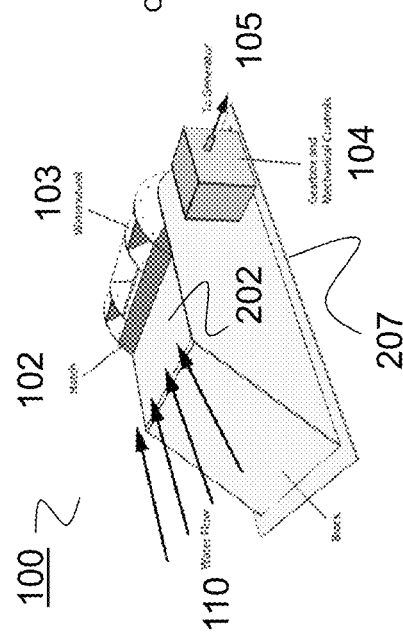
Figure 2C. Schematic
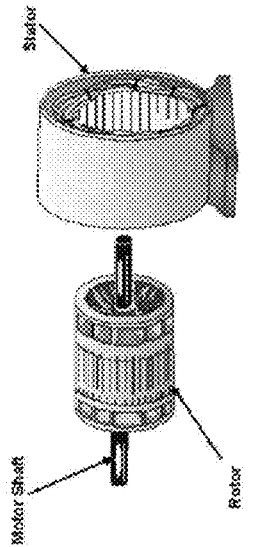
Figure 2D. Variable Torque and Power Generator (VT&PG)

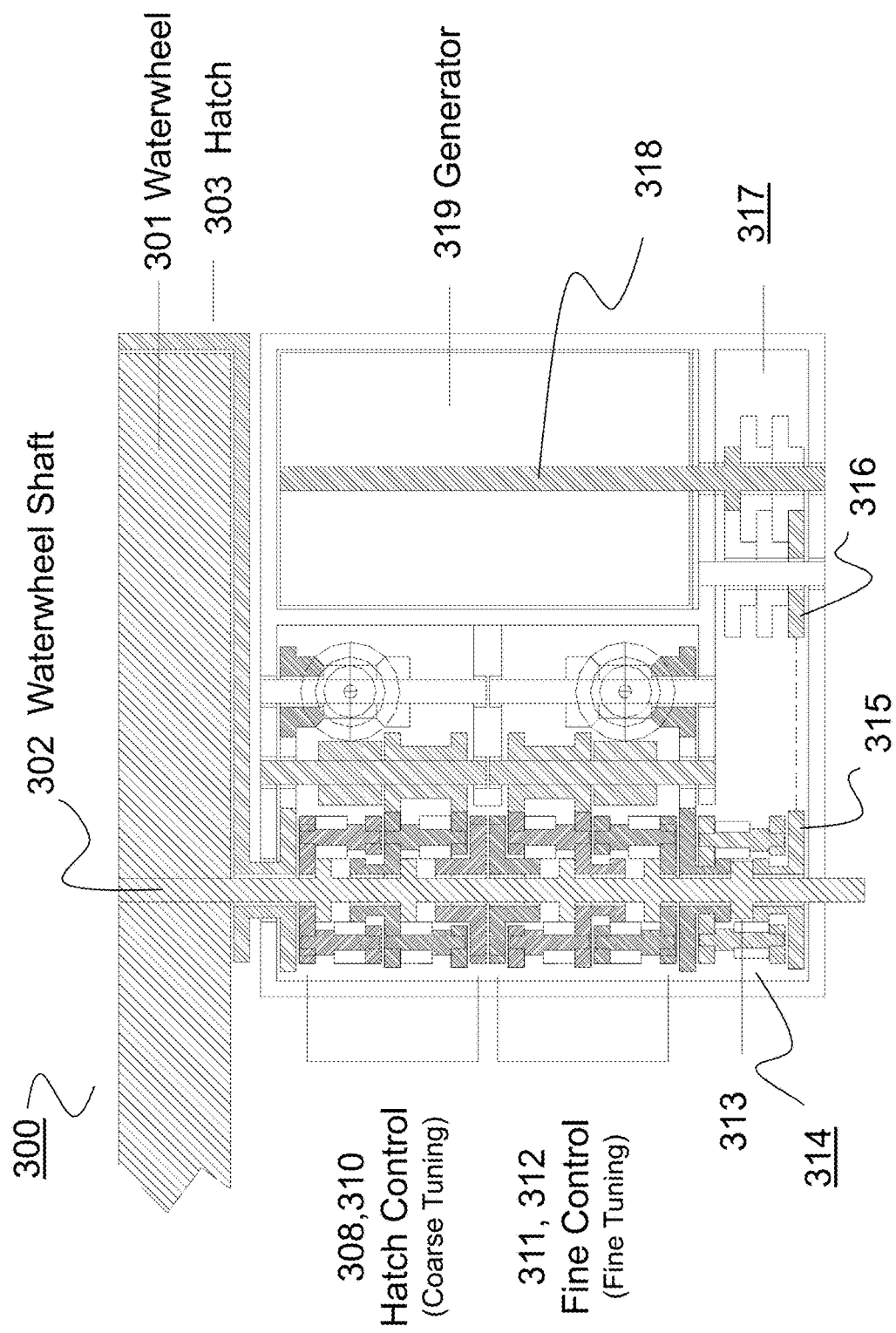
Figure 3A. MHK Turbine with Hatch Control and Fine Control

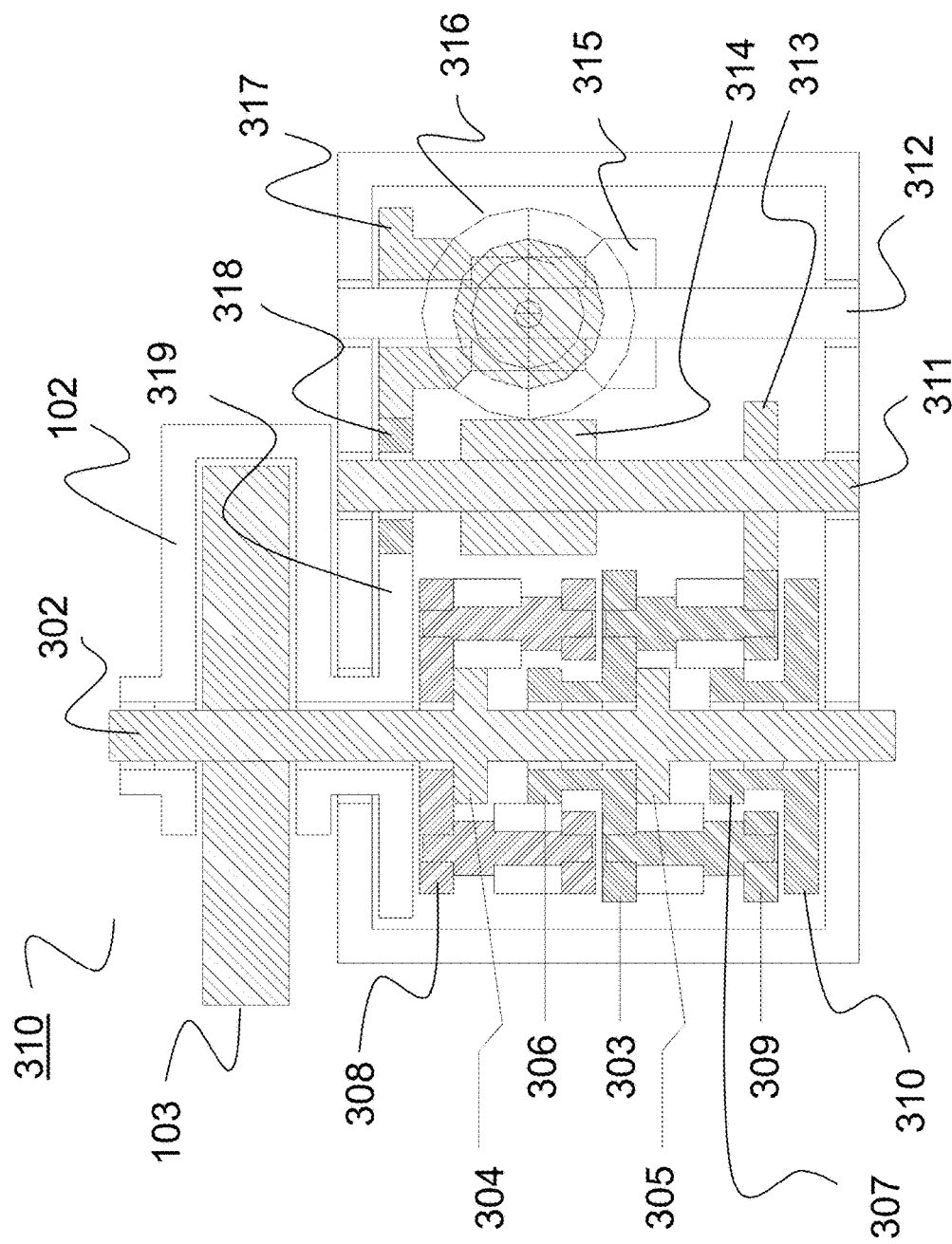
Figure 3B. Controls built and tested for Sample #1

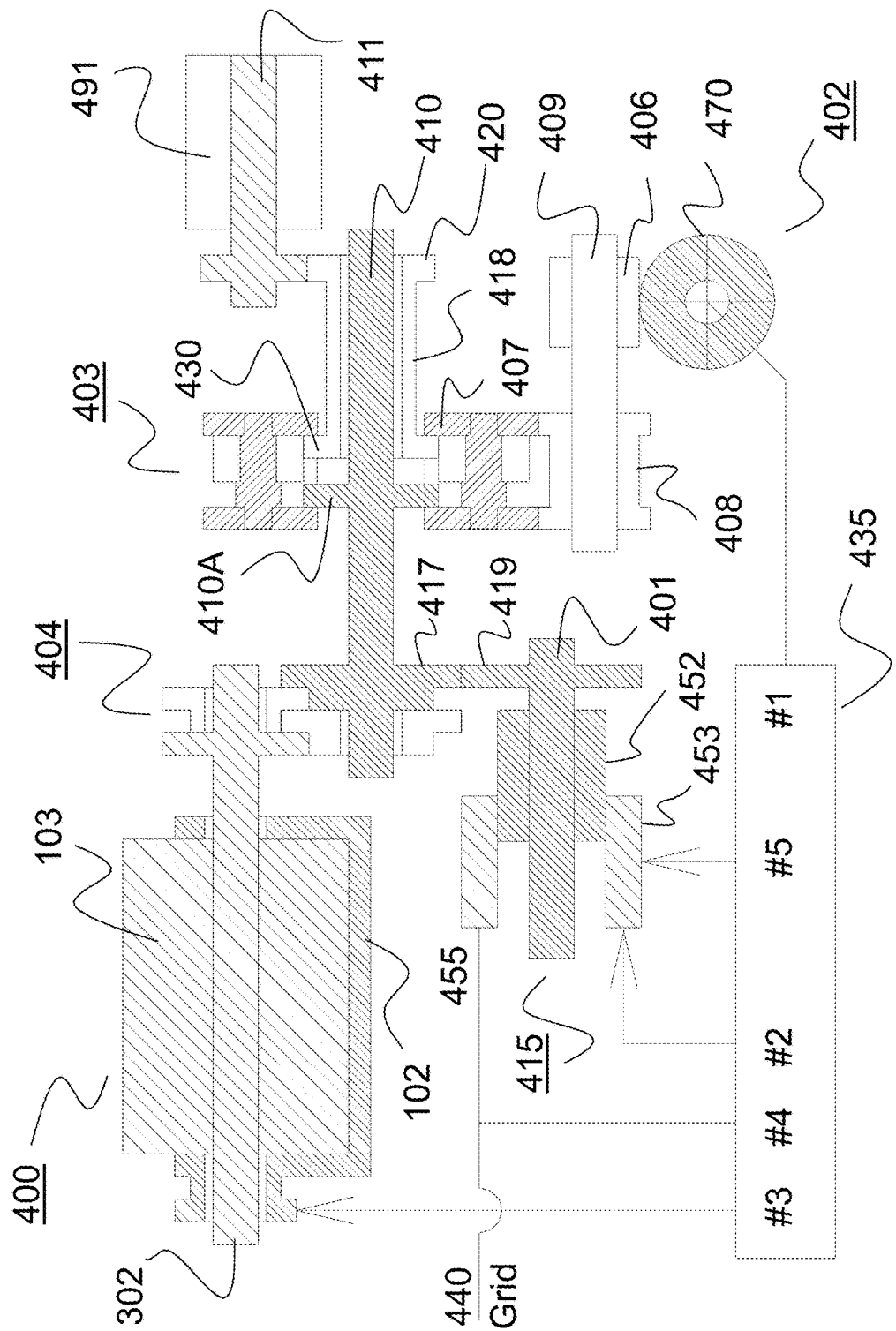
Figure 4A. Transgear-controlled Variable Power Generator and Hatch

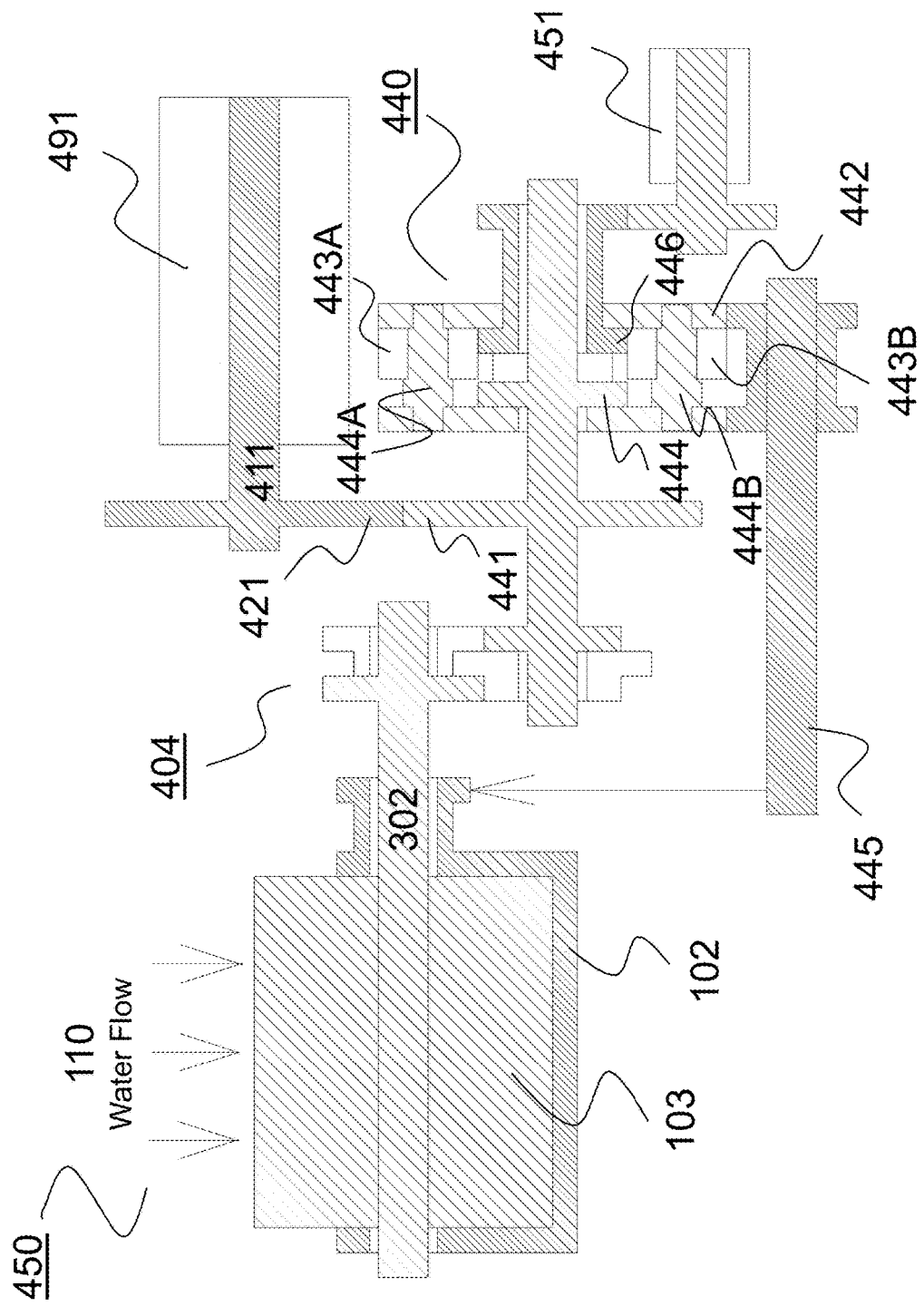
Figure 4B. Controls used for Sample #2

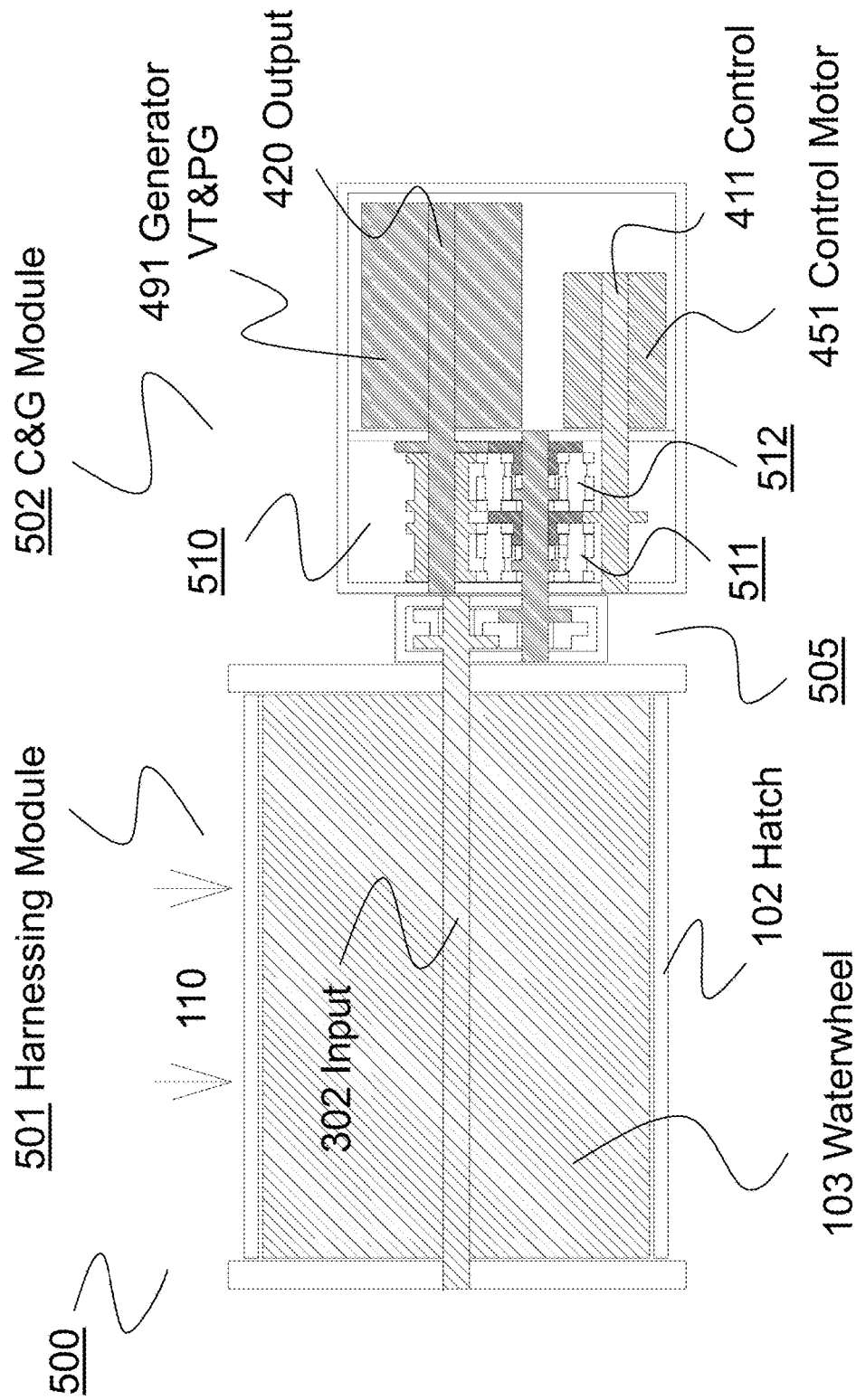
Figure 5. Controls developed for Sample #3

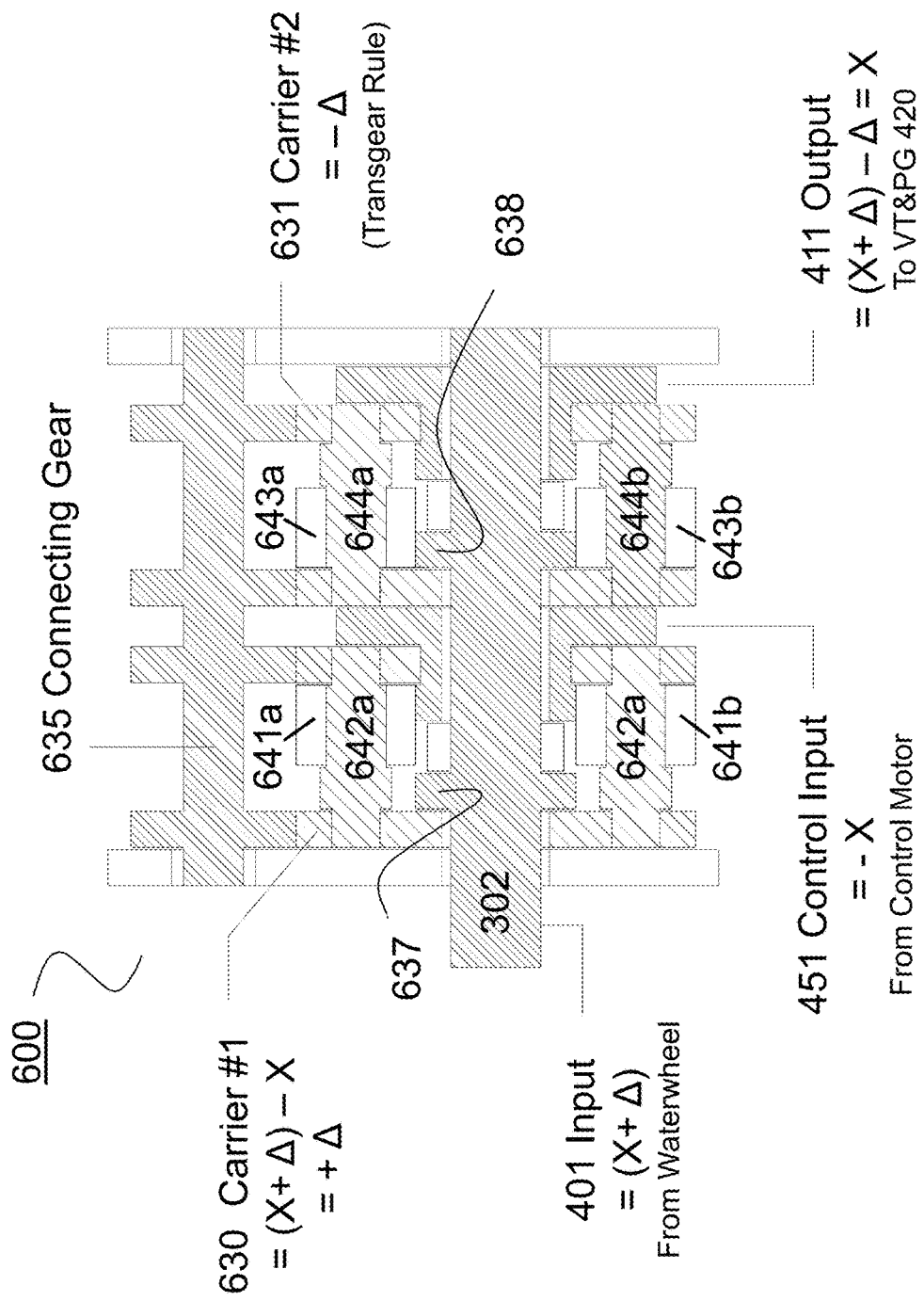
Figure 6. Two Transgear Control "Hummingbird"

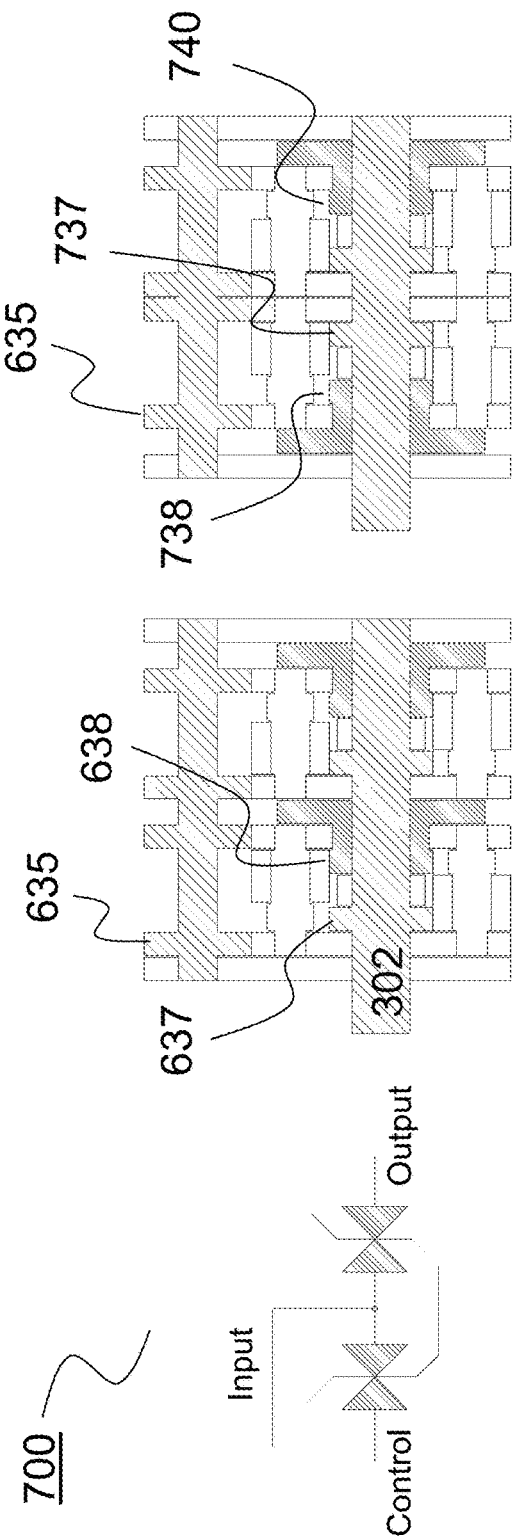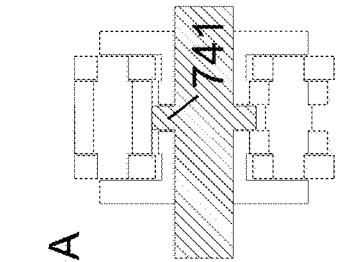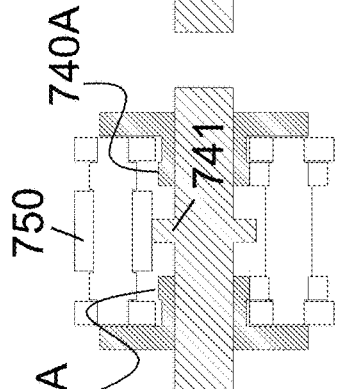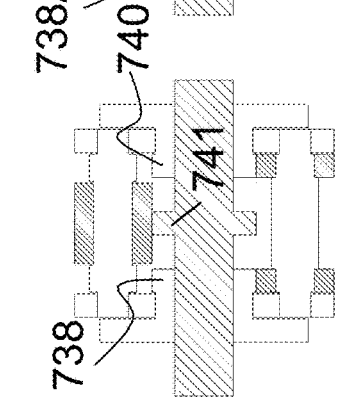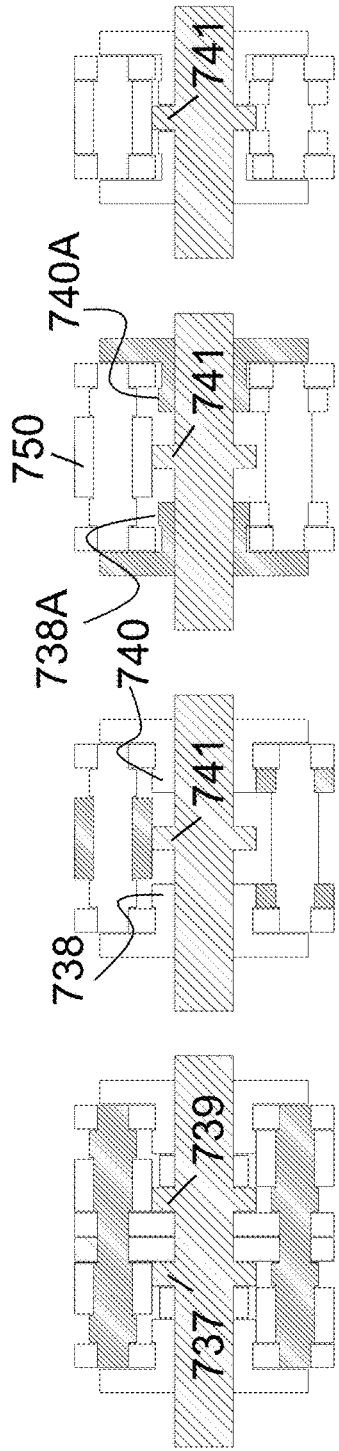
Figure 7A
Figure 7B
Figure 7C
Figure 7D
Figure 7E
Figure 7F
Figure 7G

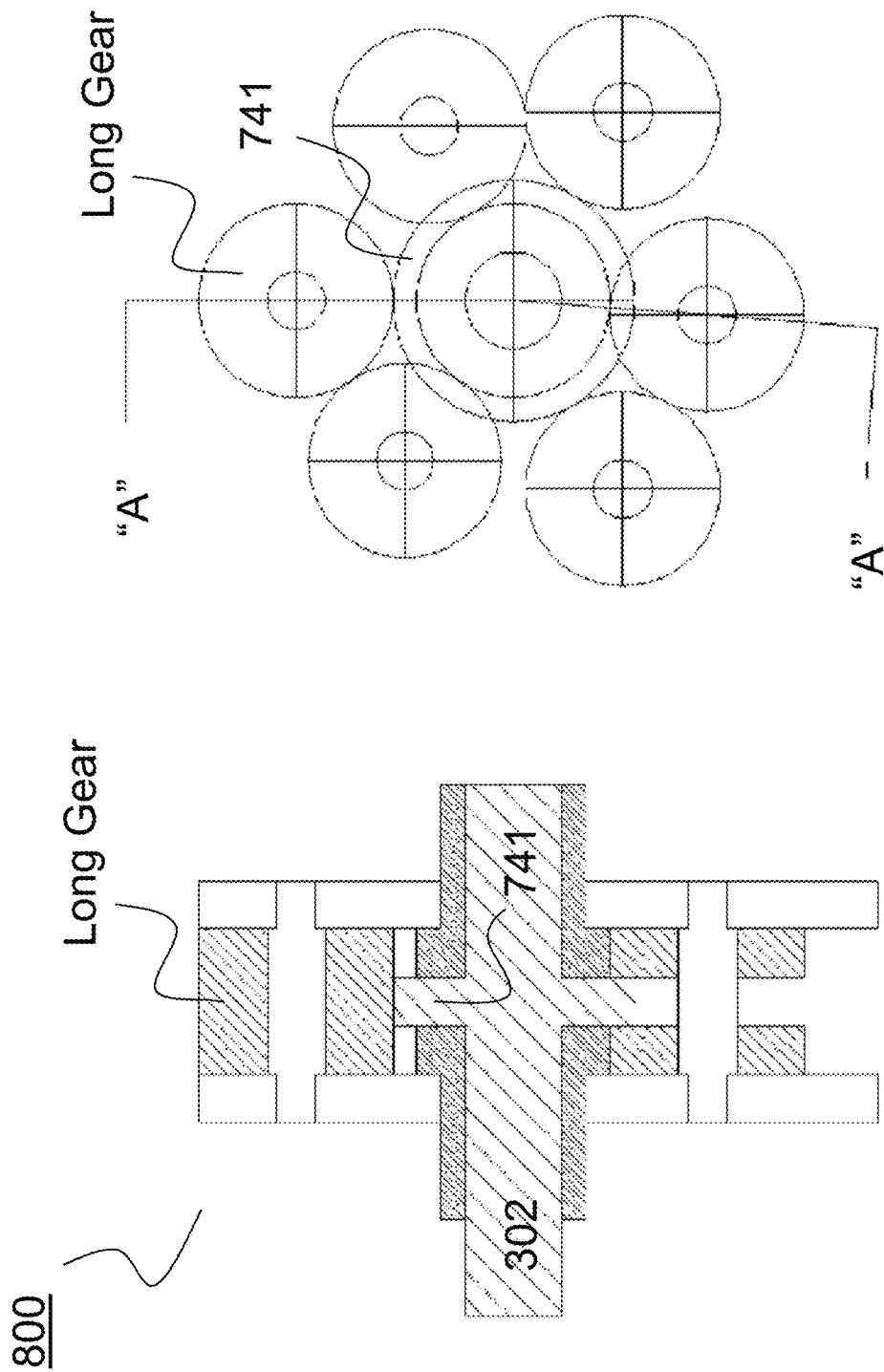

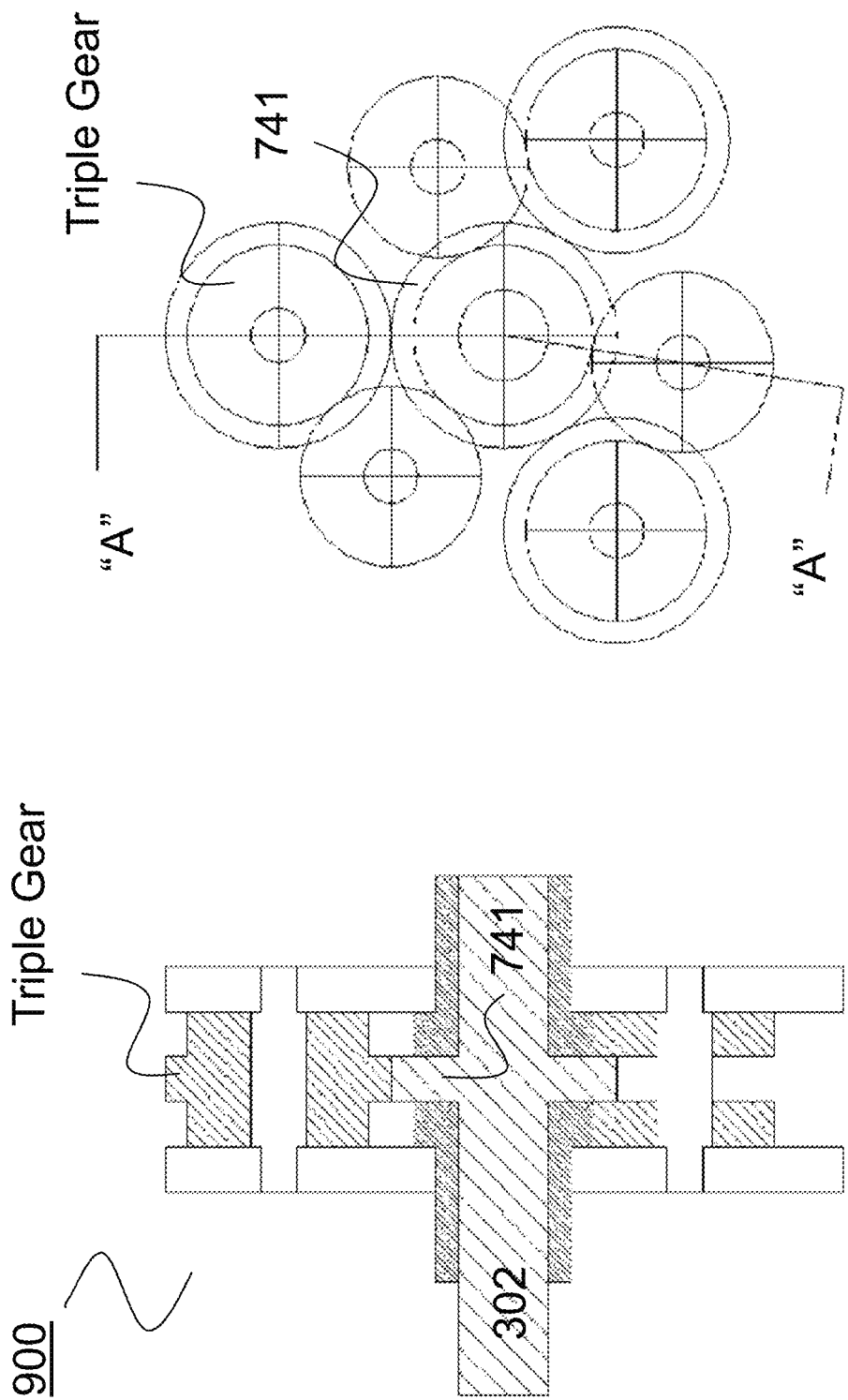

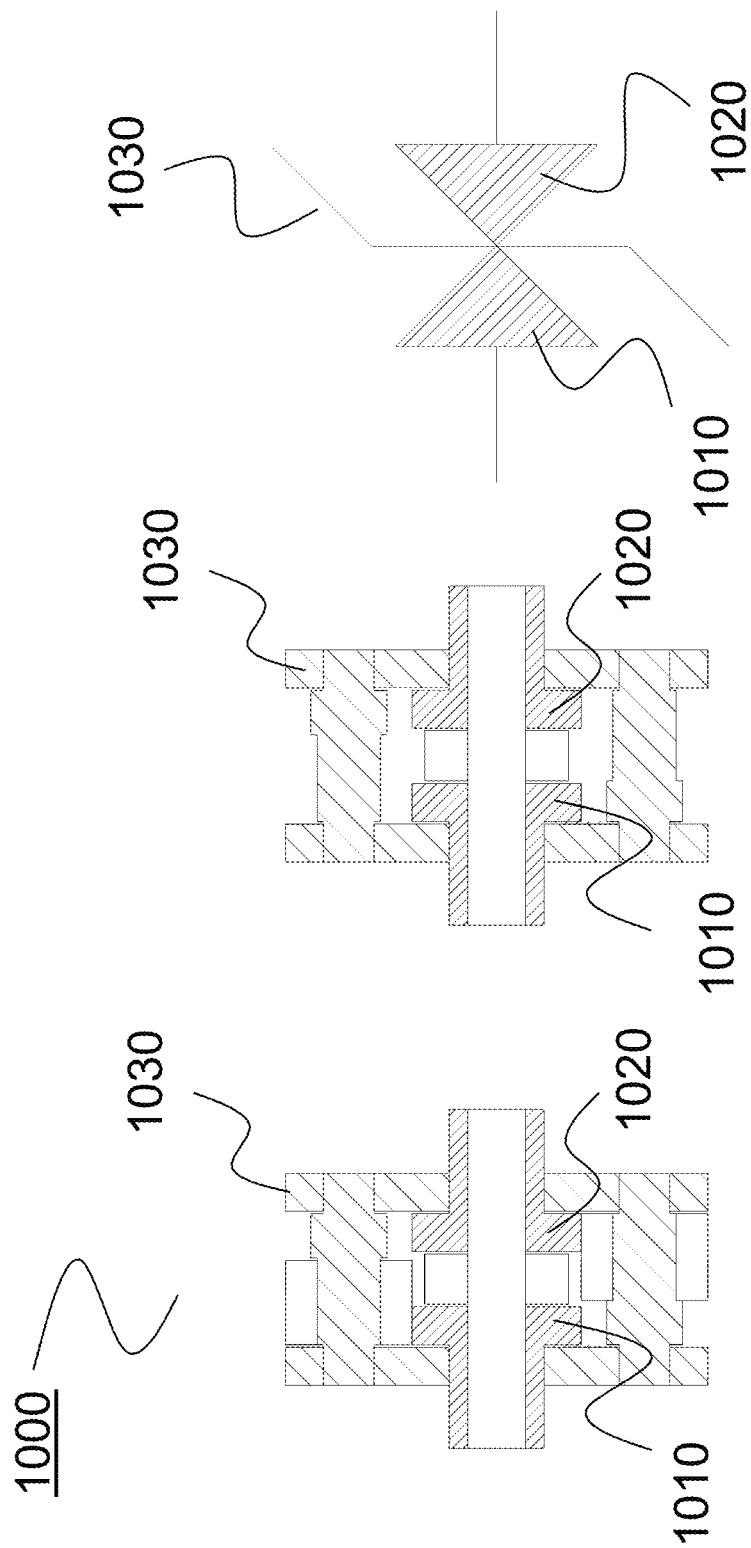

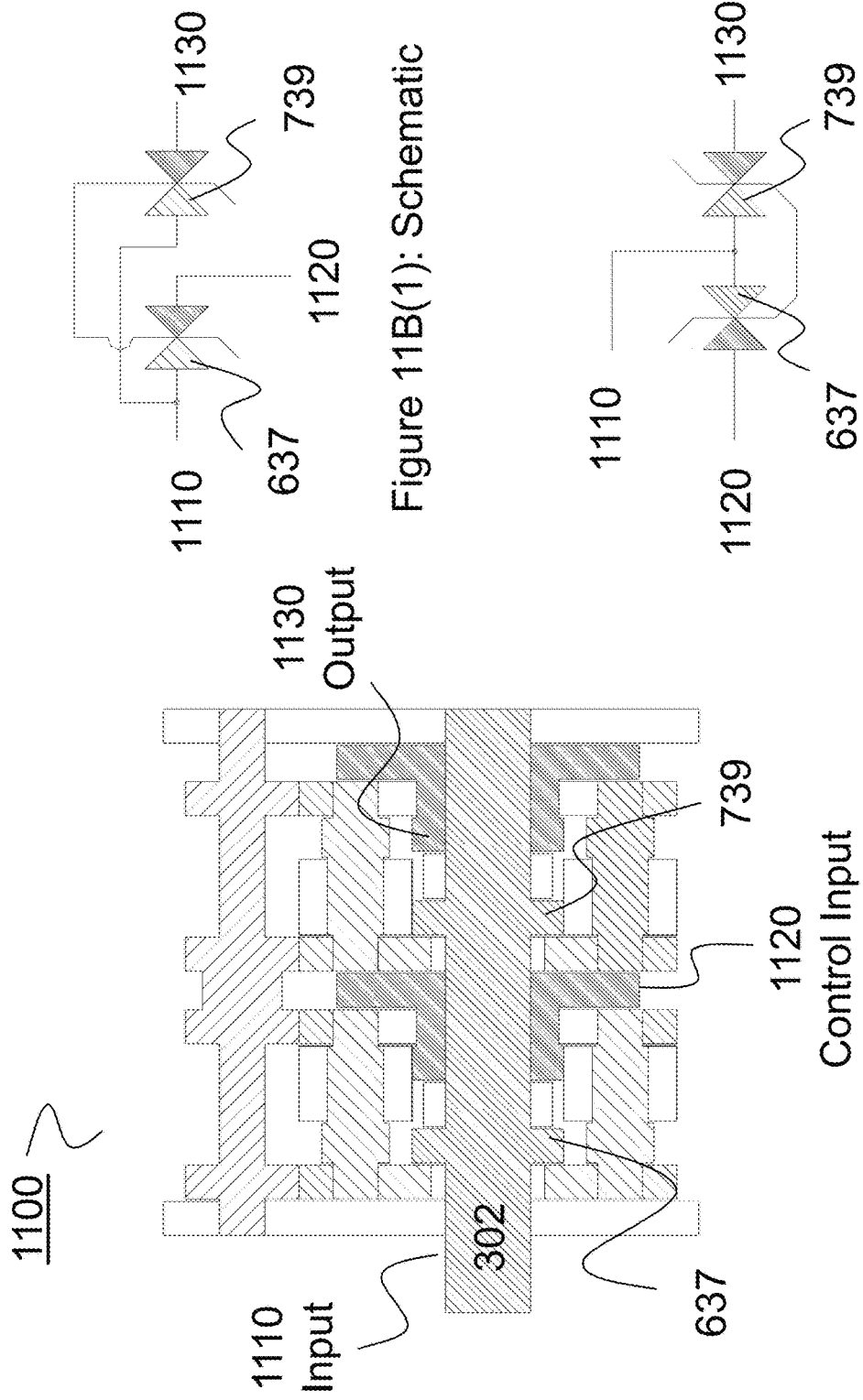

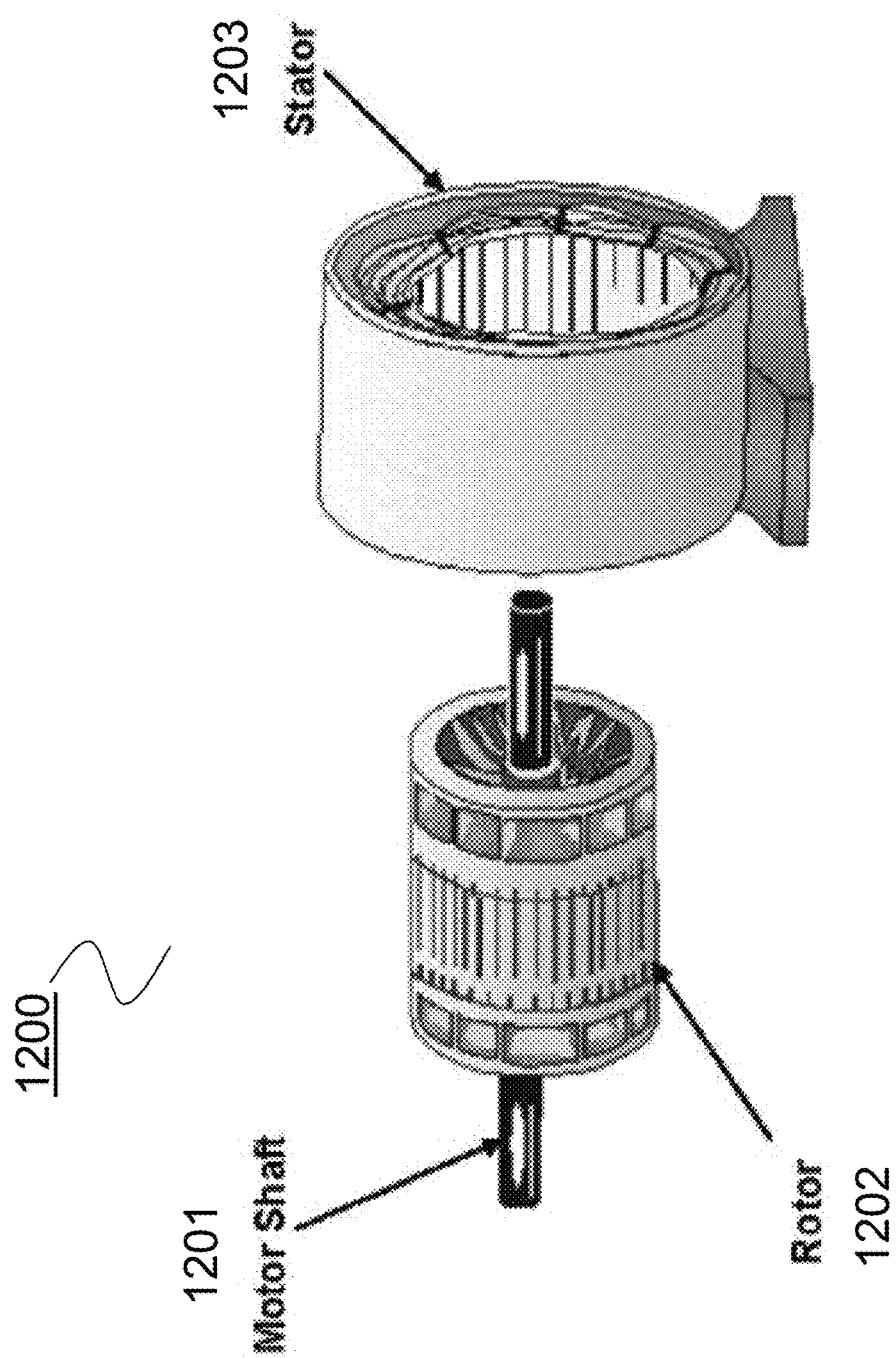
Figure 12. Variable Torque and Power Generator (VT&PG)

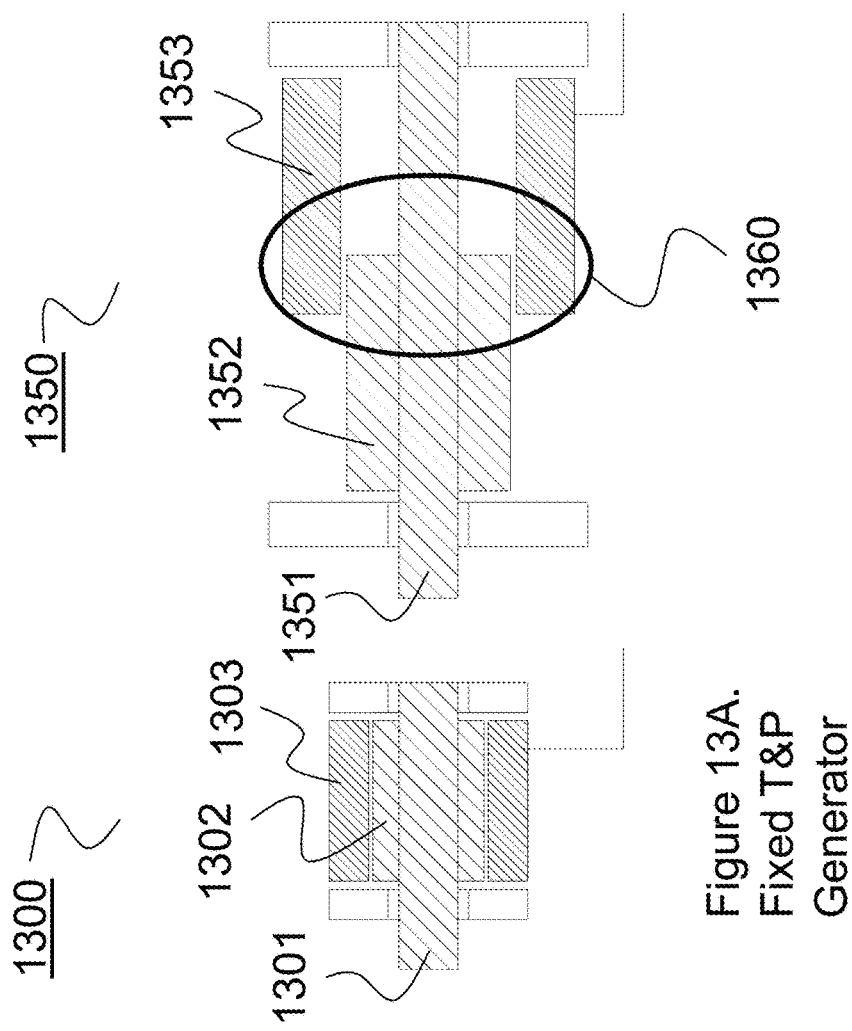
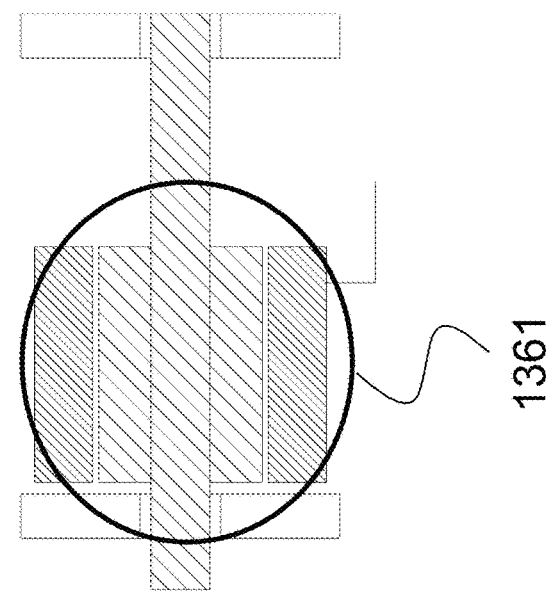
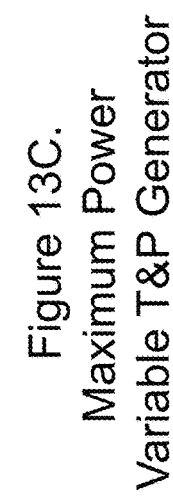
Figure 13A. Fixed T&P Generator
Figure 13B. Minimum Torque Variable T&P Generator
Figure 13C. Maximum Power Variable T&P Generator

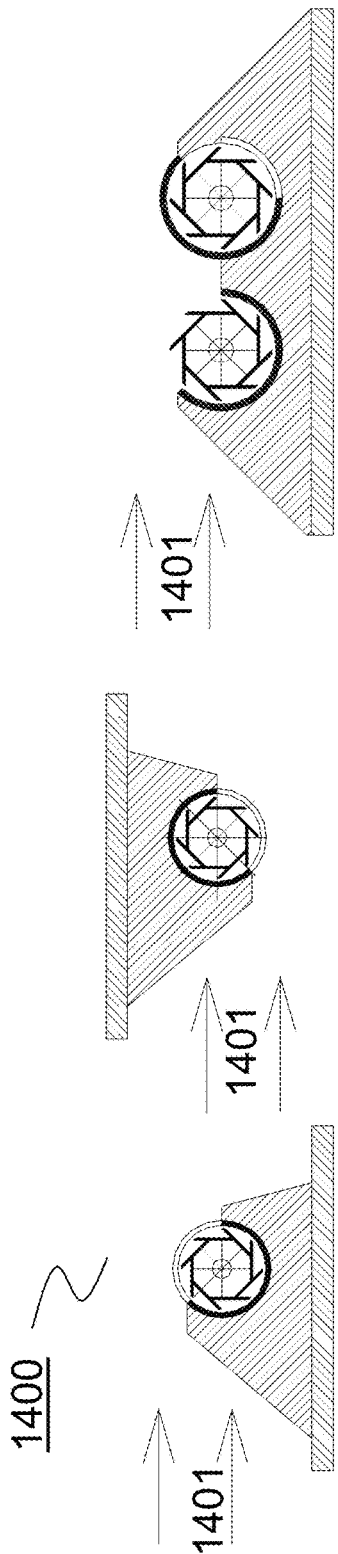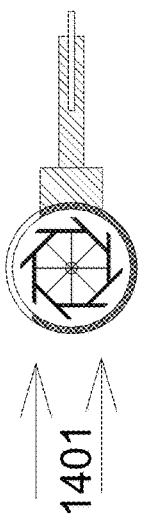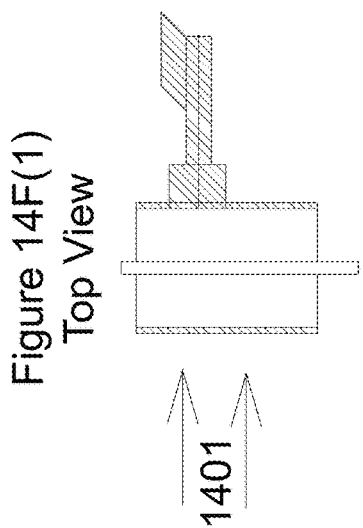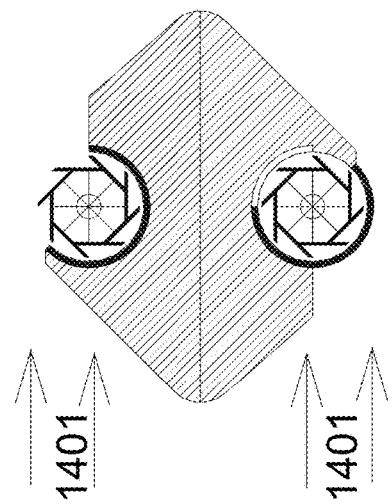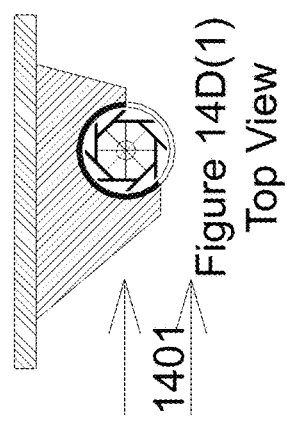

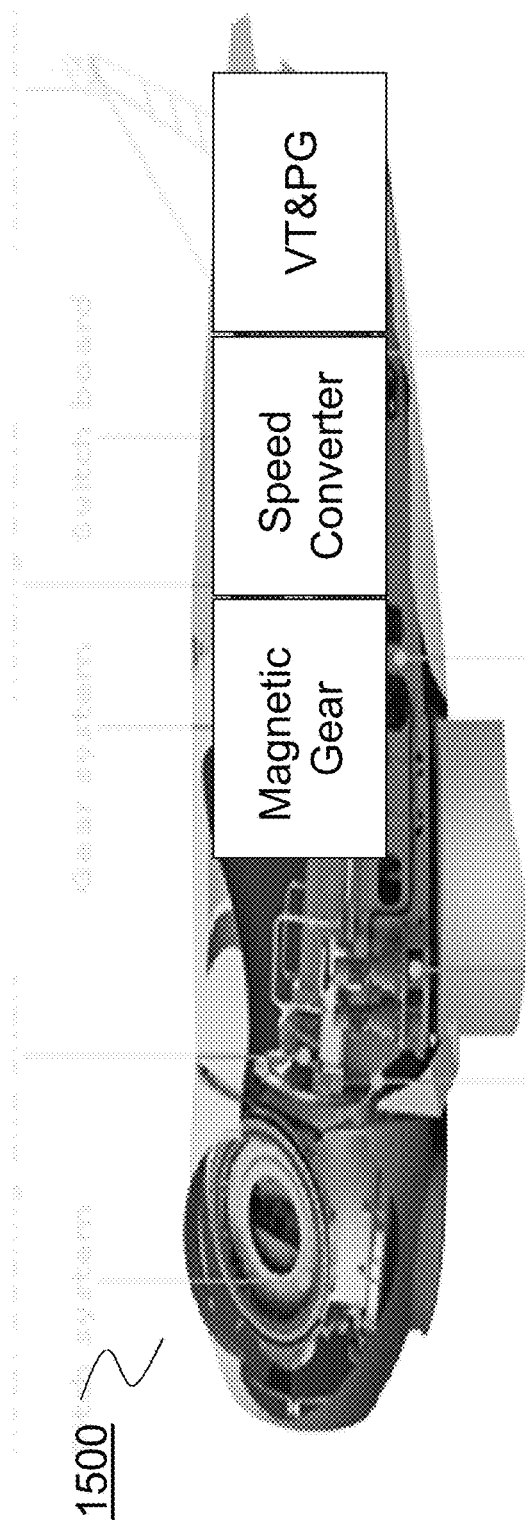
Figure 15A Cut-away View of a Wind Turbine
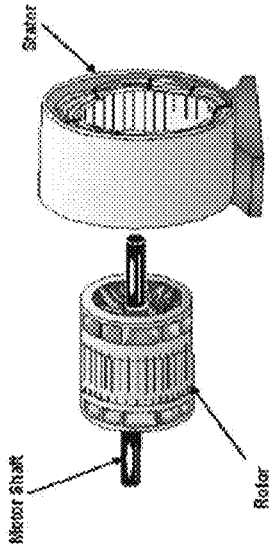
Figure 15D
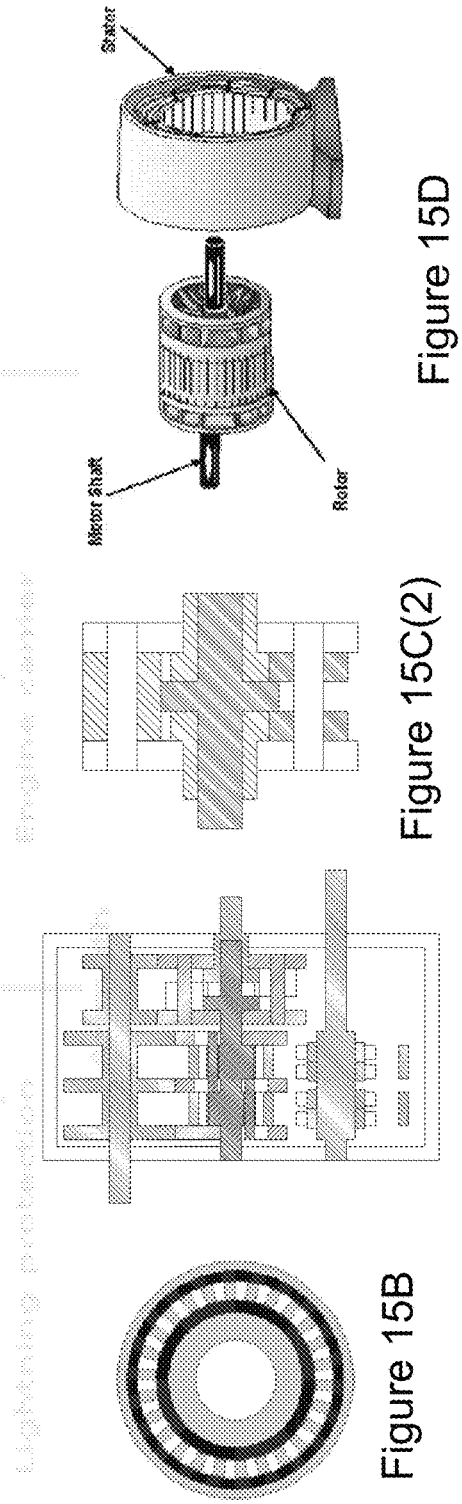
Figure 15C(2)
Figure 15C(1)
Figure 15B

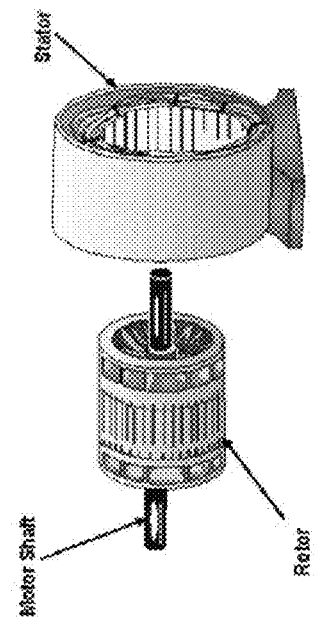
Figure 16D
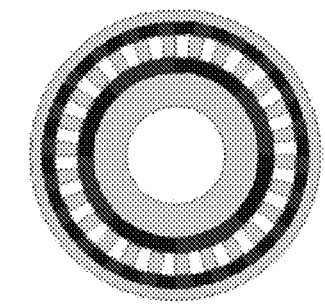
Figure 16C
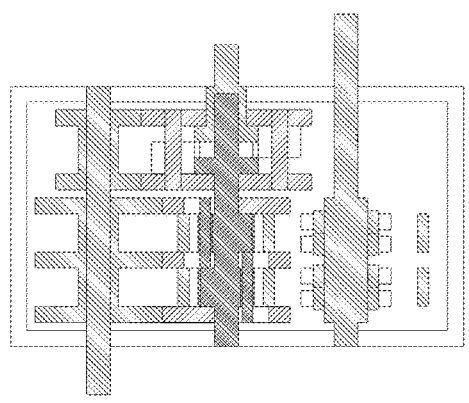
Figure 16B(1)
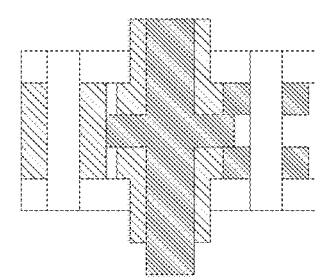
Figure 16B(2)
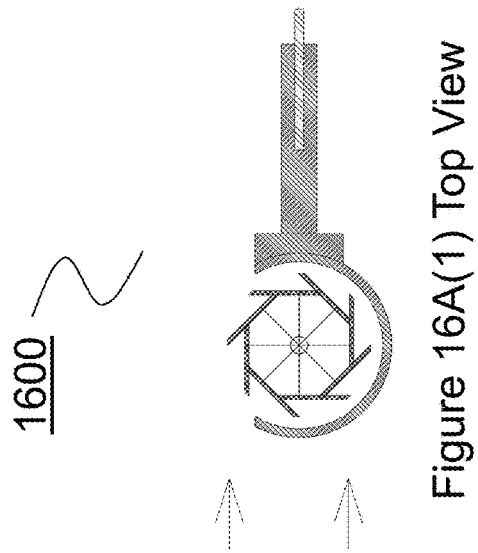
Figure 16A(1) Top View
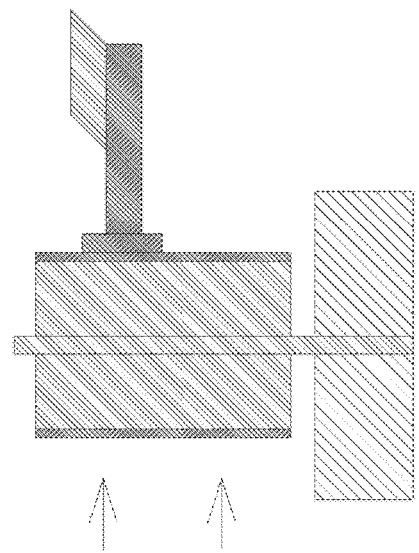
Figure 16A(2) Side View

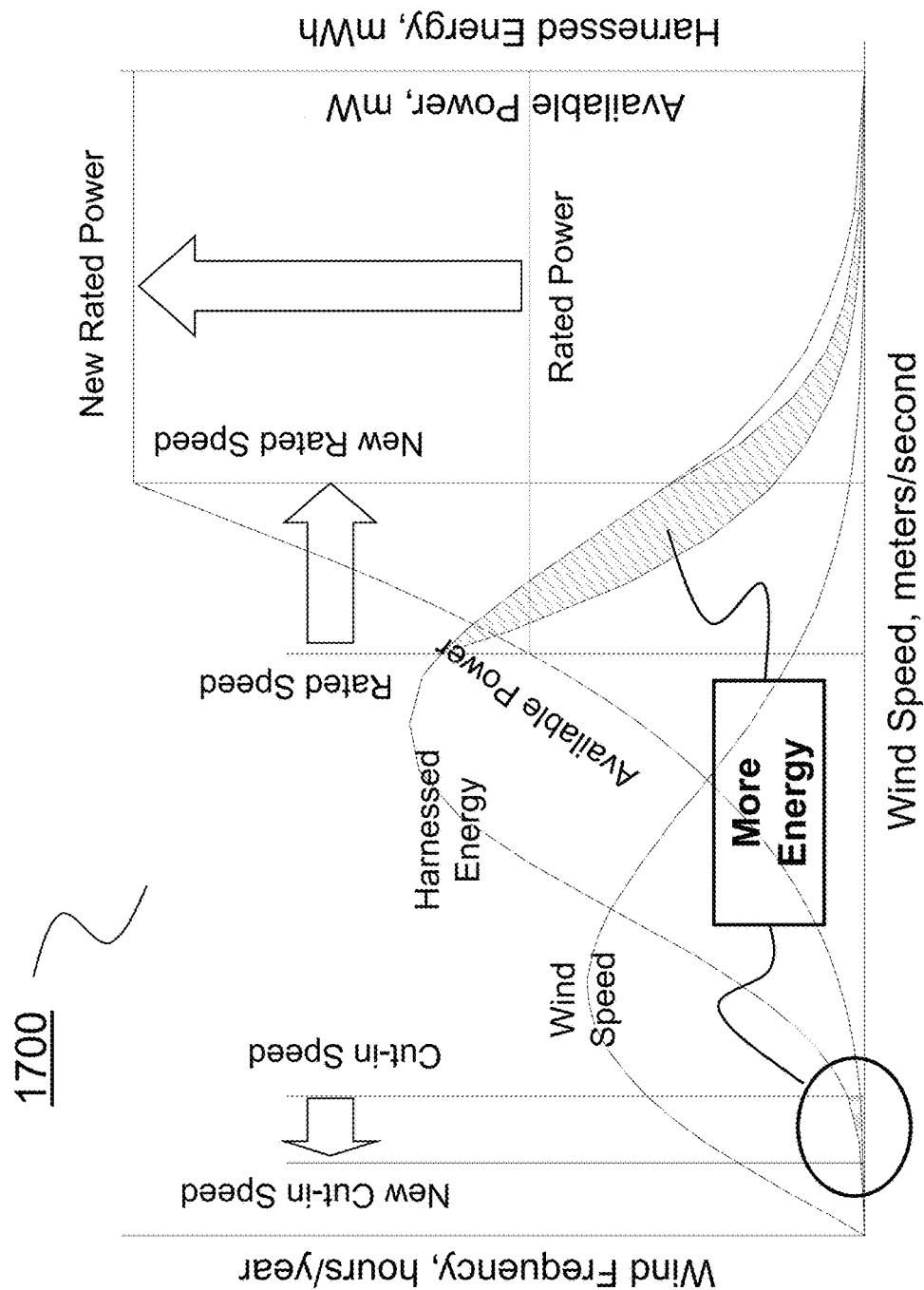
Figure 17. Harnessing More Energy with VT&PG

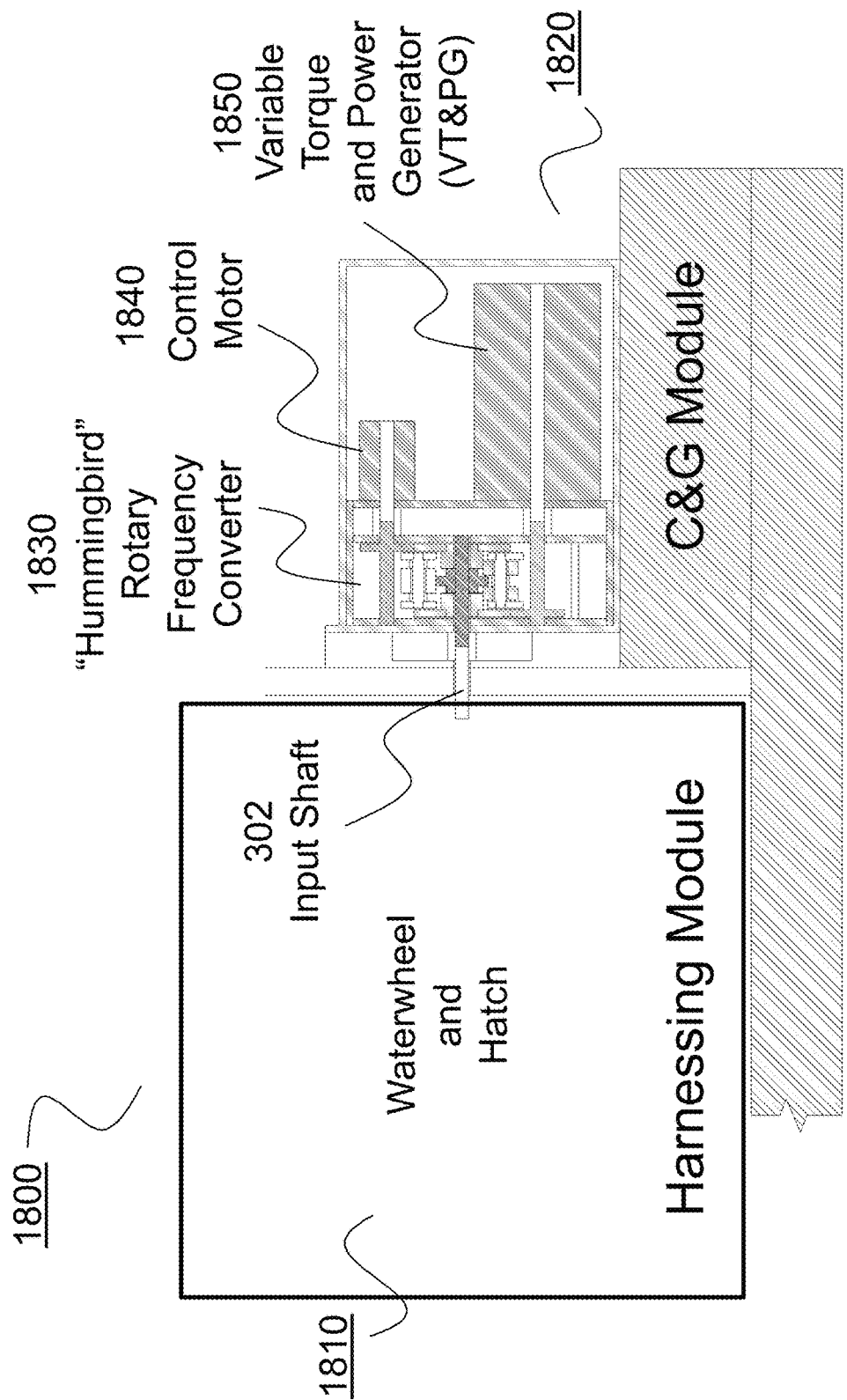
Figure 18. Layout of Sample #3

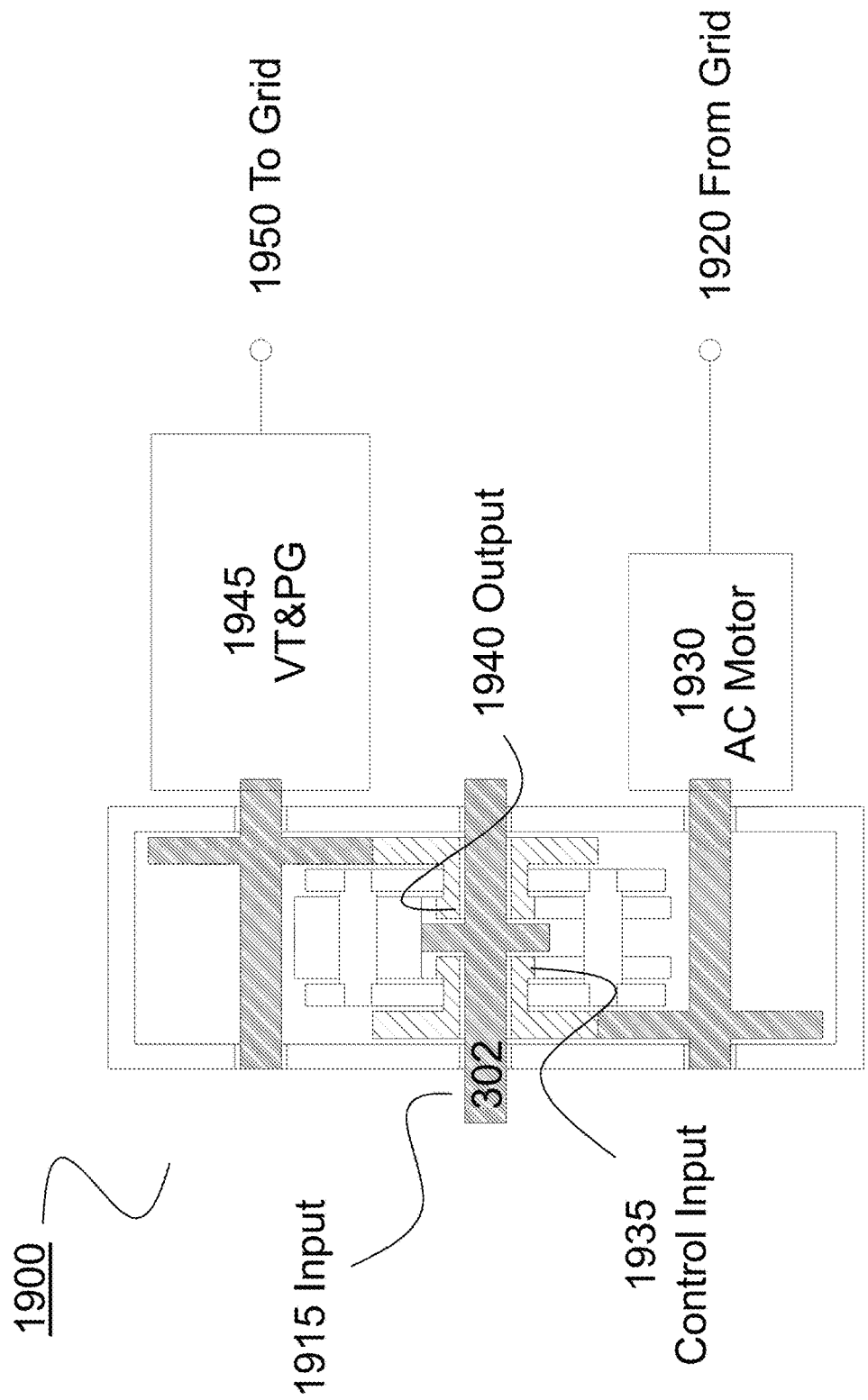
Figure 19. Grid Power is available - use grid power

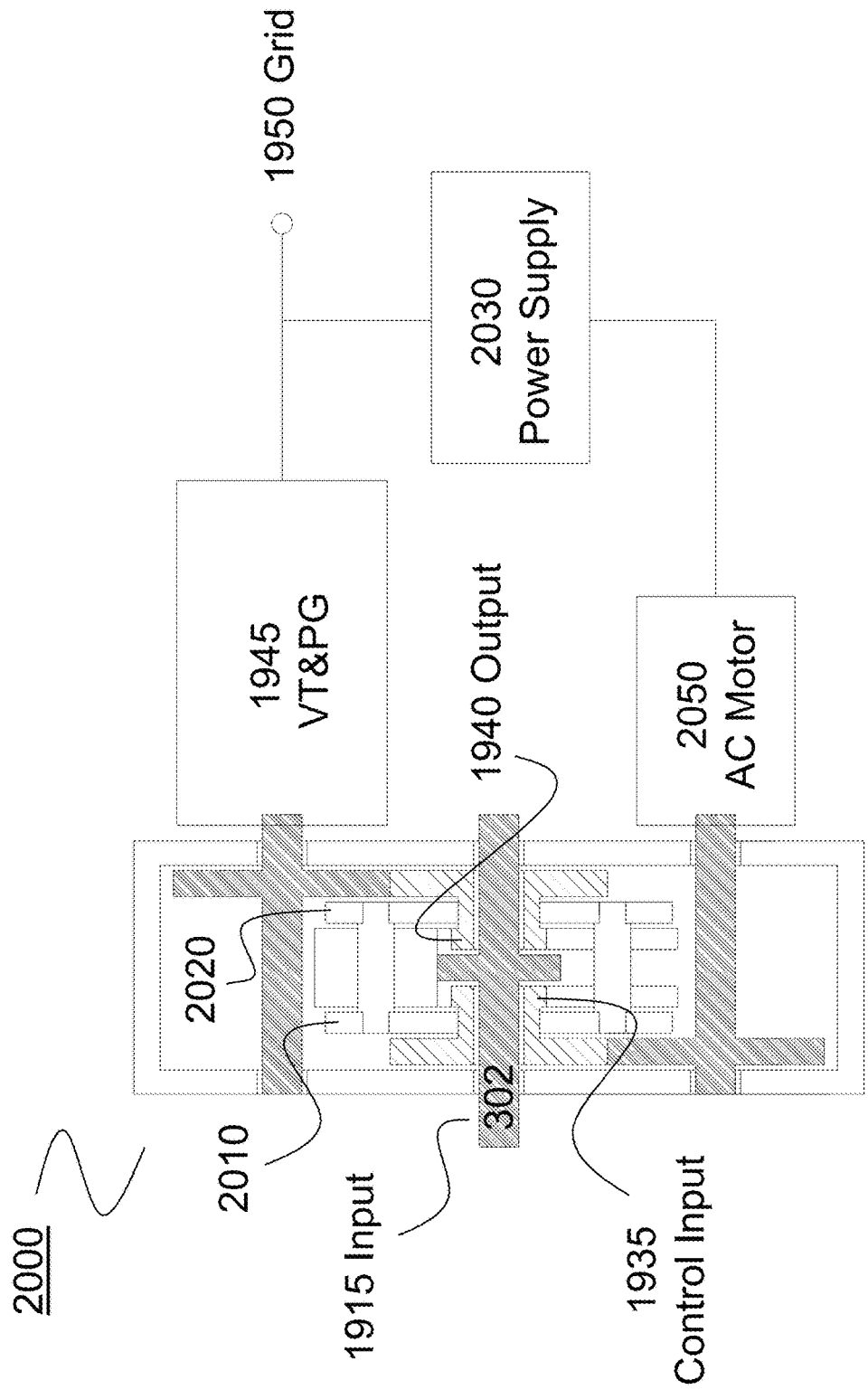
Figure 20. No Grid Power – Option #1

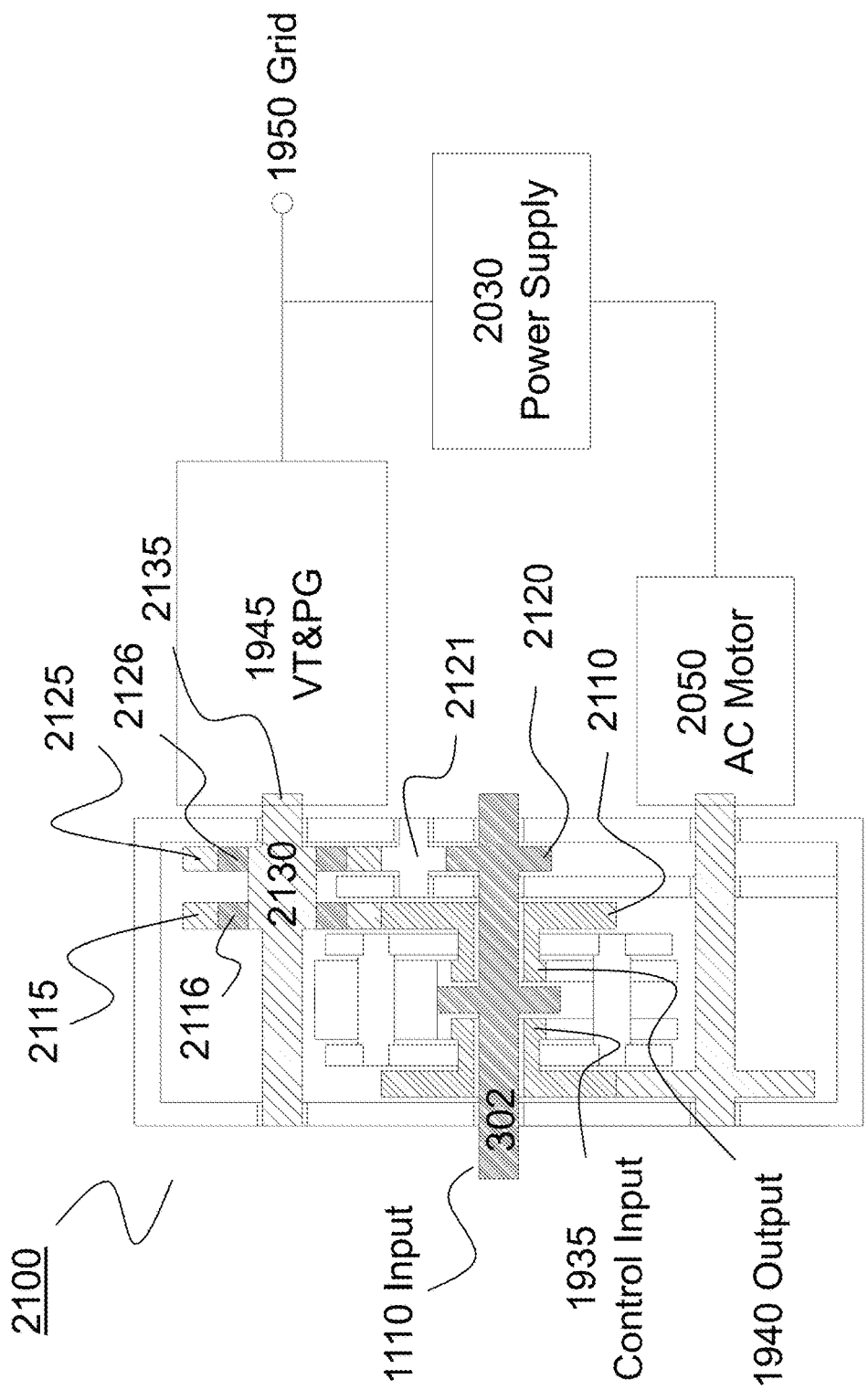
Figure 21. No Grid Power – Option #2

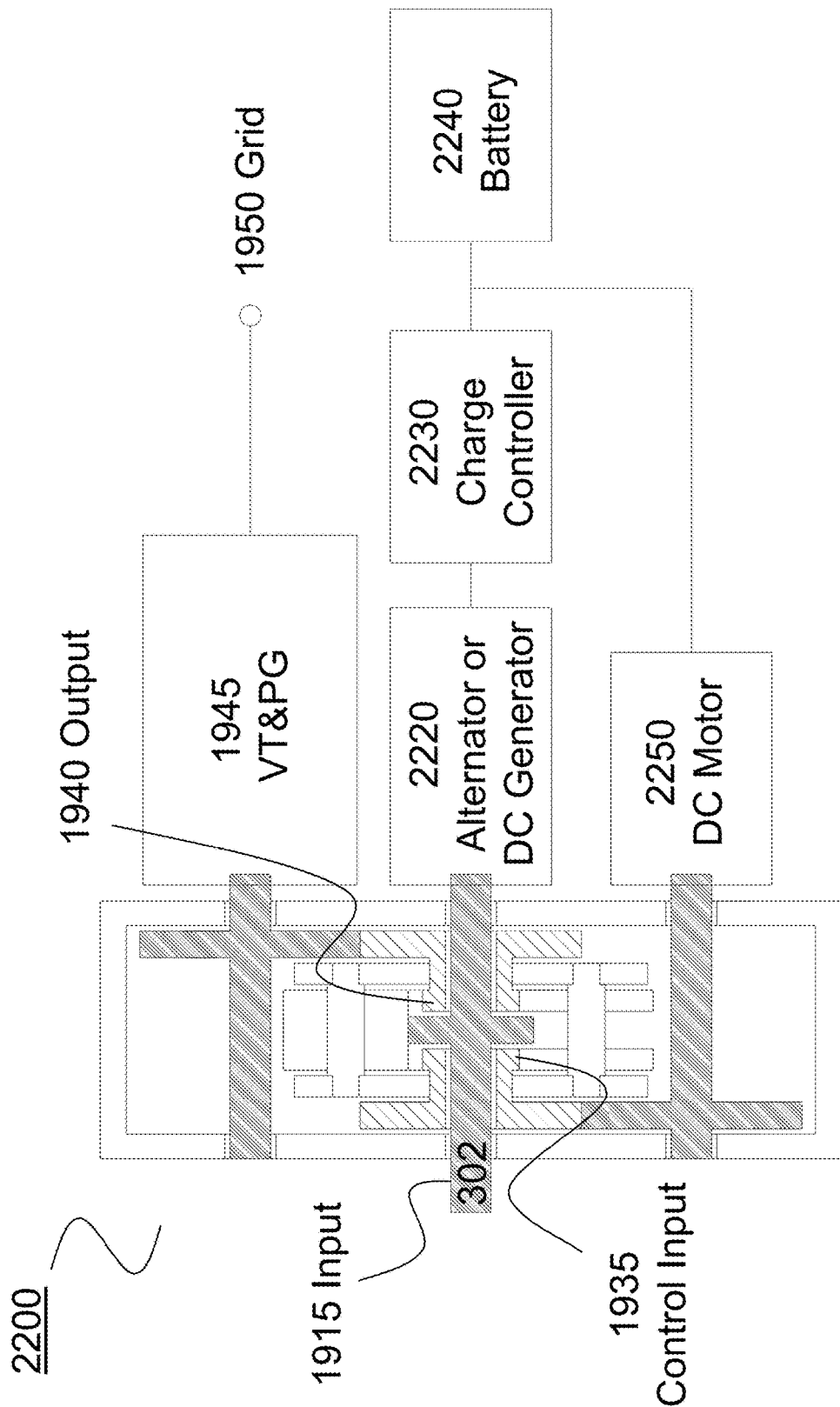
Figure 22. No Grid Power – Option #3

RENEWABLE ENERGY MARINE HYDROKINETIC OR WIND TURBINE

This application is a continuation-in-part of U.S. patent application Ser. No. 14/838,867, now allowed, filed on Aug. 28, 2015, which is a continuation-in-part of U.S. patent application Ser. No. 14/829,354, now allowed, filed Aug. 18, 2015, which claims the benefit of priority to U.S. Provisional Patent Application Ser. No. 62/039,096 filed Aug. 19, 20152014 and U.S. patent application Ser. No. 14/829,354 is a continuation-in-part of U.S. patent application Ser. No. 14/255,377 filed Apr. 17, 2014 (now U.S. Pat. No. 9,151,269 issued Oct. 6, 2015), which is a continuation-in-part of U.S. patent application Ser. No. 13/915,785 filed Jun. 12, 2013, (now U.S. Pat. No. 8,702,552 issued Apr. 22, 2014), which is a divisional of U.S. patent application Ser. No. 13/568,288 filed Aug. 7, 2012 (now U.S. Pat. No. 8,485,933 issued Jul. 16, 2013) which claims the benefit of priority to U.S. Patent Application Ser. No. 61/521,408 filed Aug. 9, 2011, and to U.S. Patent Application Ser. No. 61/523,846 filed Aug. 16, 2011 and U.S. application Ser. No. 13/568,288 filed Aug. 7, 2012 is a continuation-in-part of U.S. patent application Ser. No. 13/425,501, filed on Mar. 21, 2012, (now U.S. Pat. No. 8,641,570 issued Feb. 4, 2014) which is a continuation-in-part of U.S. patent application Ser. No. 13/384,621, entitled "Apparatus and Method for Providing a Constant Output from a Variable Flow Input" filed Jan. 18, 2012, (now U.S. Pat. No. 8,388,481 issued Mar. 5, 2013), being a national stage entry application of PCT US 10/42519 having an international filing date of Jul. 20, 2010, all applications of Kyung Soo Han and being incorporated herein by reference as to their entire contents.

TECHNICAL FIELD

The technical field of the invention relates to providing a method of harnessing renewable energy with a marine hydrokinetic (MHK) or wind turbine, for example, comprising a constant speed motor and a variable to constant speed converter comprising spur gear assemblies of three variables which convert variable rotational speed to constant rotational speed. The turbines may utilize a variable torque and power generator (VT&PG) (increasing or decreasing torque and power to match light or heavy wind or slow or fast river speed conditions), for example, to control output power frequency and voltage. The marine hydrokinetic (MHK) or wind turbine may be useful for generating alternating current electrical energy and, more particularly, to a marine hydrokinetic (MHK) or wind turbine for efficiently collecting (harnessing) hydrokinetic or wind energy (water or wind energy) using a hatch or by varying propeller pitch which may be controlled by three variable Transgear™ gear assemblies as controls, for example, such that least one spur/helical gear Transgear assembly having an input, an output, and a control utilizes a variable torque and power generator (VT&PG) and feedback for regulating output electrical power generated by the turbine to a grid compatible constant output frequency and voltage so that the power may be immediately usable by an electric power grid.

BACKGROUND OF THE INVENTION

Hydroelectric and wind energy are two major sources of so-called renewable energy. In the U.S.A. in 2015 (EIA), 33.3% or one-third of all electric energy is produced by steam generation using coal. A third source of renewable energy comes from the sun (only 0.6%) and a first source comes from water (hydro amounts to 6.0% according to the EIA). Water flows at variable speed and so does wind. An advantage of water flow is the mass/density, inertia or power that may be generated by the flow of water compared with the flow of wind (wind amounts to 4.7%) where wind must be collected by large wind-driven propellers or rotor blades.

Natural gas provides, in the same year, about 32.8% of U.S. electric energy, and nuclear energy now provides about 19.6%, for example, via steam turbine generation. Petroleum, such as oil, is used to produce only about 1% of U.S. electric energy. Coal, natural gas, biomass (1.6%) and petroleum are carbon-based and when burned produce emissions which can be costly to mitigate or, if not mitigated, can be dangerous or at least increase the so-called carbon footprint in the earth's atmosphere. The supply of coal, gas and petroleum is also limited. Nuclear energy generation, unless handled with extreme care, is dangerous, and the spent nuclear fuel becomes a hazard to the world.

Consequently, the hope of electrical energy generation for the future is in so-called renewables which include, but are not limited to, the air (wind power), the sun (solar power) and water (hydroelectric and marine hydrokinetic, MHK, energy) sources. The great Coulee dam, Hoover dam and the Tennessee Valley Authority are exemplary of projects started in the early $20^{th}$ century in the United States for generating hydroelectric power, but these require large dams to build potential energy for turning electric turbine generators. Large hydroelectric generators in such dams on rivers in the United States are now being replaced with more efficient and larger capacity generators. But the number and utility of dam-based hydroelectric power is limited, and the dams block migrating fish and commercial river traffic on navigable rivers. The dam backs up a river to form a lake which can take away valuable land resources that could be used to grow food or permit animals to feed. On the other hand, the created lakes provide water control and recreational use for boating, fishing and the like. Nevertheless, there remains a need for a wind or water driven electricity generator that may save the cost of building a dam or a large wind mill with giant propellers, permit the marine hydrokinetic (MHK) generation of electricity and use the high inertia flow of a river or the flow of ocean currents, tides and waves. Similarly, wind-driven turbines should be more efficient, reliable, and designed to convert variable wind speed over a greater speed range to constant frequency and voltage output for delivery to an electric power grid.

So-called biomass energy generated from plant and animal material (waste) may amount to 1.6% of total renewable energy but has similar problems to those of non-renewable carbon-based systems and can cause emissions. While hydroelectric energy amounts to the next greatest renewable source at about 6.0%, it is believed that more can be done to efficiently utilize the rivers, tides and ocean currents in the United States than by hindering the flow of water commerce by the construction of dams.

Other renewable sources include geothermal, wind and solar energy. While these are "clean" sources, to date, their growth has been unimpressive. Only wind energy is supported by the Department of Energy, and wind energy is forecast to grow from 4.7% in 2015 to 20% of all US energy in approximately 20 years.

Further detail of a conventional wind turbine is described in WO 1992/14298 published Aug. 20, 1992 and assigned to U.S. Windpower, Inc. A variable speed rotor may turn a gearbox to increase the rotational velocity output of the rotor and blade assembly. For example, a so-called cut-in speed (rotational velocity) of a rotor may be about six revolutions per minute (when electricity may be generated) and the rotor blade may typically cut-out at about 30 revolutions per minute (a maximum for electricity generation without damage to the turbine) by controlling the pitch of the rotor via a pitch control system during conditions of high wind velocity and to reduce rotor blade noise. Typically, wind speeds over 3 meters/sec are required to cause the large rotor blades to turn at the cut-in speed (rotational velocity). Wind frequency between cut-in and cut-out speeds (velocities) has been measured to vary depending on location, weather patterns and the like. Placement high on a hill or a mountain of a wind turbine, for example, may be preferable to locating the wind turbine at a low point in a valley. Consequently, it may be recognized that there are periods of time when wind turbines do not have sufficient wind speed to operate at all depending on weather conditions, placement and the like.

When wind speed and direction vary, a pitch control system may measure the wind speed and adjust the pitch of rotor blades to pass more wind and so control the rotor blade from turning too fast as well as a yaw control points the rotor blade into the wind. Yaw control (for example, via a wind vane) may supplement pitch control to assist in pointing a rotor into the direction of wind flow. These vanes may also be used for water driven tidal turbines. Noise from rapid rotor velocity in wind turbines can be abated, for example, by turning the blade parallel to the wind using a wind speed control system to thus maintain the rotational velocity close to a cut-out speed. An anemometer placed at the tail of the known wind turbine may measure wind velocity and provide a control input. The tail (or vane) of the turbine may be equipped with a rudder or wind vane for pitch or yaw control. Horizontal or vertical stabilizers may be provided for pitch or yaw control. The rudder or wind vane may help point the variable speed rotor into the wind. In general, however, there is a problem with known wind turbine systems that only a portion of the wind energy available at a site of a wind turbine farm may be harnessed resulting in harnessing only a portion of the kinetic energy of the available wind to feed an electric power grid. There is also a problem with gearboxes which comprise meshed gears that can break during large wind gusts or at high tidal water speeds or during large wave motion.

A mechanical meshed gear gearbox is known to have a failure rate of approximately 5%. Electronics used in a wind turbine has the highest potential failure rate of 26%. Control units generally exhibit a failure rate of 11%. Sensors and yaw control exhibit approximately a 10% failure rate. The failure rate of a variable frequency converter or variable power converter may be on the order of 26% (electronics) according to an ongoing consortium's study of drive train dynamics at the University of Strathclyde, Glasgow, Scotland. According to published information, the mean time between failures of a 1.5 megawatt wind turbine, for example, may be only two years on average (but the real failure rate is an industrial secret); and the replacement cost may be over $50,000 (for example, $50,000 to $100,000 US) per variable frequency converter. A failure rate of the variable speed generator of a known wind turbine is on the order of 4.5%. Consequently, problems related to known wind and water turbines relate closely to the failure rate of gearboxes, generators, variable frequency converters or variable power converters and associated electronics and inefficiencies of operation.

A solution to the identified problems is to provide a constant rotational velocity as an input to the constant speed electric generator so that the generator in turn can produce a constant frequency output and deliver a constant voltage and variable current directly to an electric grid. Transmissions or speed converters, for example, have been developed or are under development by the following entities: IQWind, Fallbrook and Voith Wind (Voith Turbo) to provide a constant output from a variable input. U.S. Pat. No. 7,081,689, (the '689 patent) assigned to Voith Turbo of Germany is exemplary of an overall system control design providing three levels of generator control. Voith provides a so-called power split gear and a hydrodynamic Fottinger speed converter or transformer adapted to be connected between a rotor and gear assembly and a synchronous generator for outputting power to a grid, for example, at 50 Hz (European).

A recent development in the art of gearboxes is a magnetic gear which relies on permanent magnets and avoids meshed gears. Magnetic gears, for example, developed by and available from Magnomatics, Sheffield, UK, have an air gap between sheath and shaft and so there is no meshing of gears in a gearbox. Alternating north and south poled permanent magnets may slip with a gust of wind or burst of water energy with a magnetic gear but break a meshed gear gearbox. A magnetic gear yields when a large gust of wind or a tidal or wave burst of water energy turns a gearbox input while a meshed gear may break or cause considerable wear to a meshed gear of the gearbox.

Many of the problems of wind turbines are carried forward into marine hydrokinetic (MHK) turbines such as run-of-the-river, tidal, ocean wave and hydrokinetic river turbines. There is the same problem of having to convert a harnessed variable frequency to a constant frequency and voltage output. On the other hand, there are many advantages for harnessing marine hydrokinetic (MHK) energy: the density (mass or inertia) of water is much greater and its speed is not as variable as wind speed especially when used in a relatively constant flowing river or steam which flows continuously in the same direction (such as the Mississippi River of the United States). Generally, for example, rivers flow in one direction and the major ocean currents do the same. Wave generation, however, in oceans and other large bodies of water varies in magnitude with wind and weather. Ocean shore waves are more predictable and a strong undertow can be useful for electric power generation. Tides are reversible (high tides flowing in and low tides flowing out) and associated known turbines may be limited to one direction of water flow (high or low tide).

A concept for improving wind turbines is use of a direct drive in which a rotor and a shaft drive a generator. Such a direct drive may be used to directly drive an electric generator without using a gearbox, i.e. directly driving the generator. The failure and efficiency problems of gearboxes may be eliminated by eliminating the gearbox with direct drive. One may increase the number of poles by fifty times, for example, use power converters or frequency converters and so result in reduced down time for gearbox repairs at the expense of increased cost due to the bigger generators. A speed converter to convert variable speed to constant speed is disclosed in priority U.S. Pat. No. 8,388,481 of Kyung Soo Han. The speed converter is entirely mechanical and so scalable and improves upon the high failure rate, reliability and efficiency of known electrical/mechanical systems. Speed converters under development are also frequency converters and are shown in this and other priority patent applications and are referred to as infinitely variable speed converters or simply speed converters.

Traction drive infinitely variable transmissions are known produced by Torotrak and Fallbrook. The Fallbrook device may be described by U.S. Pat. No. 8,133,149. A 2004 report, NREL/TP-500-36371, concluded that the Fallbrook device is not scalable. Further speed converters are described by FIGS. 10 and 11 of priority U.S. Pat. No. 8,641,570 of Differential Dynamics Corp. (also known as DDMotion). The DDMotion speed converters are differentiated from those of Torotrak and Fallbrook by their gear drives (no toroids, pulleys or belts) and that they are scalable.

A turbine was produced by Hydrovolts, Inc. The apparatus may comprise a waterwheel and may comprise a gear and belt drive inside which may, because of the belt, be susceptible to slippage. At their web site, a 15 kW waterfall turbine is described for use at a waterfall such as at spillways or outflows in industrial plants. Hydrovolts also produces a 12 kW zero-head canal turbine that allegedly can capture the energy in moving water. Reference may be made to U. S. Published Patent Application 2010/0237626 of Hammer published Sep. 23, 2010, which appears to comprise a waterwheel construction. Hydrovolts' rotating (hinged) blades may control some of the water flow speed, but it is urged that the exposed rotating blades may be susceptible to damage.

A river turbine is known which may be attributed to Free Flow Power Corp. and may have been lowered to the bottom of the Mississippi River or attached to a piling. It is believed that such a device may be very similar to a turbine engine of an airplane but below water level and the water, at velocity, drives a turbine propeller (blades). Due to lowering prices of natural gas, the project became economically unviable (according to their press release in 2012).

It is generally known in the art to utilize devices that look much like wind turbines to capture water energy. A tidal and/or river current turbine is known from FIG. 1 of U. S. Pub. Patent App. 2009/0041584 published Feb. 12, 2009. The diagram provides the labels, showing direction of water flow "A" (from right to left). Note that the turbine rotates on a pole so that rotor blade 150 captures the water as it passes. This device may be available from Verdant Power. It is respectfully submitted that Verdant Power may currently be strengthening their blades and adding pitch control.

A rotating ring device including a rotating ring is known which is available from Oceana Energy Company. FIG. 1 of U. S. Published Patent Application 2012/0211990 of Aug. 23, 2012 of Oceana Energy allegedly comprises hydrofoils both external and internal to the rotating ring.

Perhaps the most like a wind turbine in appearance is the known tidal energy turbine of ScottishPower Renewables, a division of Iberdrola. According to press releases, this tidal device with its propeller (rotor blades) is capable of generating approximately 10 MW of power as an "array" perhaps of twelve or more such devices at less than 1 MW each.

Devices are also known for harnessing the power in water waves such as ocean waves. Such a device is known and available from Pelamis Wave Power. FIG. 1 of Pelamis's U. S. Pub. Patent Application 2013/0239566 of Sep. 19, 2013 shows a Pelamis device 10 floating in the ocean. The device 10 may comprise a plurality of hinged sections 12-A, 12-B, 12-C, 12-D and 12E. The device wiggles and generates power in the direction of a wave from left to right. As the wave passes through the hinged sections, the sections 12A through 12E move up and down with the height of the wave. The wave thus creates movement which may be used to generate electricity. It may be said that the higher the wave, the greater the movement; the calmer the seas, the less the movement and the less generation of electricity.

Most maps of the United States show the major rivers which include the Ohio, the Mississippi, the Missouri, the Snake River and the Pecos and Brazos Rivers of Texas. As can be seen from such a map, there is a great potential to harness the water energy of these rivers in the United States and to power, for example, the entire area covered by the Mississippi River and its tributaries including the Missouri, the Platte and the Red Rivers. Using dams across these rivers to generate electricity would be costly and hinder river traffic and marine lives. It may be that only Free Flow Power has developed a device for use on such a river as the Mississippi (but Free Flow Power abandoned the Mississippi project in 2012).

Similarly, a map of the world shows the major rivers of the world, further highlighting the potential to harness water energy in rivers world-wide. Also, ocean current maps are known, for example, showing the Gulfstream. Proximate to the United States, the strong ocean current of the Gulfstream is known to flow northward along the east coast of the United States. On the west coast of the United States, there is known a southward current initiating as the north Pacific drift and, as it passes California, is referred to as the California Coastal current. Other important world currents include and are not limited to the Peru/East Australian current, the Brazilian current/Benguela current, the west wind drift, the West Australian current, the Kuroshio current and the North Atlantic drift. These strong currents are known and have the potential to generate a considerable amount of power but are presently not used for electricity or power generation. (Predictable ocean tides cause water to flow upstream in ocean tributaries at high tide and downstream in ocean tributaries at low tide and may be more widely used for electric power generation.)

A typical hydroelectric power plant is mounted within a dam of a river. A first step in harnessing water energy in this means is to build the dam to create a pressure head that is proportional to the depth of the water backed up by the dam. The backed-up water is represented by a reservoir or lake. At the base of the dam, there may be intake gates which allow water that has been compressed by the head to flow through a penstock to a powerhouse which is one of many such powerhouses that may be constructed along the width of a large dam. One powerhouse may comprise a generator and a turbine which outputs electric power to long distance power lines. Once the water passes through the turbine, it is returned to the river downstream.

A variable torque generator (VTG) (called a VPG when varying power output) has been described in priority U.S. Pat. Nos. 8,338,481; 8,485,933; and 8,702,552 as well as priority PCT/US2010/042519 published as WO2011/ 011358. The variable torque generator has one of an axially moveable rotor and/or stator with respect to its stationary or moveable counterpart stator or rotor so as to vary the amount of overlap by the stator with respect to the rotor from a minimum when the stator is displaced from the rotor to a maximum value when the stator and rotor are proximate to or overlap one another. When used in a power generator to regulate flow of power, the VTG is referred to as a variable power generator or VPG. When used in a torque generator and a power generator to regulate torque and flow of power, the generator is referred to as a variable torque and power generator or VT&PG. Torque and/or power are at a maximum when there is a maximum rotor/stator overlap.

In particular, there is described in, for example, WO2011/ 011358 or U.S. Pat. No. 8,338,481 (the U. S. '481 patent), the concept of measuring torque/rpm on an output shaft of a system such as a wind or river/tidal/ocean wave/ocean current turbine (which may be referred to herein as a marine hydrokinetic (MHK) turbine) for providing a constant output from a variable flow input. The measured torque/rpm value may be compared with a torque/rpm value stored in a memory and, if the measured torque/rpm is high in comparison, then, the moveable rotor or stator of a variable torque generator may be moved axially to a position more in keeping with the high measured torque/rpm value, i.e. such that the stator is moved away from the rotor axially under motor control through a feedback loop. When the measured torque/rpm is low in comparison with an expected value, the moveable rotor or stator may be moved axially toward one another to match a low value of torque/rpm so that the speed of the output shaft may increase with increasing wind or water flow and vice versa. This variable torque generator (VTG) process continues so as to maintain a relationship between speed of input (such as wind or river/tide/ocean wave/ocean current) to match a desired rotational speed of output shaft and to maintain output shaft speed, for example, if used as an electric power generator, to produce 60 Hz U.S. electric frequency or in Europe 50 Hz European frequency electric power.

In either the priority '481 U.S. patent or the WO 2011/011358 printed publication priority documents directed to wind turbines, FIG. 1 is described as prior art and describes how gear boxes 108 connected to propellers can result in an expensive failure rate and replacement cost. This failure rate and replacement cost may be overcome by the recent deployment of a so-called magnetic gear which has no meshing of gears and the round components are separated by air gaps between permanent magnets so there is no meshing of gears and little to no maintenance. DDMotion has proposed a variable to constant speed generator, and FIG. 12 shows the concept of an infinitely variable torque generator, meaning that the one of the moveable rotor or the stator may be moved, for example, by a servo motor, not shown, to any position of proximity to or distance from one another or such that their respective magnetic flux fields are located far away from one another so as to not couple with one another or to couple with one another, for example, to have an effect to cause a coupling of rotor and stator and a magnetic force field tending to cause the rotor to be stationary with the stator or move with the stator. In FIG. 13, the rotor and stator of the variable power generator are shown such that the rotor 1310 is directly coupled to the shaft 1320. "When the stator parts 1330(a) and 1330(b) are moved away from rotor 1310, a minimum input torque results. The operation of a control may be as follows via measuring a torque value stored in memory proximate to the maximum torque that a given rotor shaft 1320 may receive (a maximum allowable torque value), the stator parts 1330(a) and 1330(b) may be moved by a motor (not shown) to be in removed torque position or a position in between maximum and minimum torque positions whereby a close-to-maximum torque position may be achieved in relation to the measured torque and the maximum allowable torque(/rpm) value or value stored in memory."

Most of today's water/electric conversion is directed to hydroelectric dams, tidal influences and small rivers or canals. According to www.mecometer.com, the potential for development of electricity for large rivers is on the order of over one million megawatts in the USA. Also, the capacity for generating electricity using rivers in China is 1.1 million megawatts and that of the entire world over five million megawatts. So larger river and wind farms are not only economically viable, they represent viable renewable energy sources for powering the world without hydrocarbons, high cost and with low maintenance.

There remains a need in the art to provide applications of such a variable torque and power generator (VT&PG) assembly as well as a three variable spur/helical gear assembly (Transgear™ gear assembly) in connection with the generation of electrical energy/power (variable torque and power generator, VT&PG) from renewable sources such as wind and river/tide/ocean wave/ocean current, that is, a marine hydrokinetic or wind turbine electric power generator among other possible applications for generating electric power at constant alternating current frequency and voltage for an electric power grid for a small community (for example, in developing countries) or small industrial plant (for example, 25 kw capacity) or for powering the entire Mississippi river basin (several MHK turbines placed periodically along the length of the entire Mississippi river).

SUMMARY OF THE PREFERRED EMBODIMENTS

Embodiments of a variable torque and power generator (VT&PG) associated with wind and river/tide/ocean wave/ocean current, marine hydrokinetic (MHK) turbine equipment or other application comprise a VT&PG Extension to variable torque and power motors (VT&PM), also referred to herein as variable torque and power motors (VT&PM), wherein there may be an adjustment of the relative axial overlap between the rotor and stator to control speed, torque, and power independently. A suggested application is in the potential application of VT&PG and a controlled speed motor in wind and river/tidal/ocean wave/ocean current (MHK) turbines along with the use of spur/helical gear assemblies of sun gears, sets of planetary gears and carrier gears and brackets referred to herein as Transgear™ gear assemblies or simply Transgear. First and second samples have been described in Kyung Soo Han's prior patent applications. A third sample is discussed in the present patent application.

In wind and MHK turbines, a speed converter is used for the purposes of adjusting the harnessed speed of the input which may be slow or fast depending on the rate of wind or river velocity with respect to a desired constant output speed (rotational velocity or electric power frequency) for generating electric power to be fed to an electric power grid. The embodiment of a variable speed converter has been constructed and three samples are considered having three variables and different "Goldfinch" and "Hummingbird" varieties of simpler and more complex forms constructed and tested. These Goldfinch and Hummingbird varieties of variable to constant frequency and voltage control all provide mechanical synchronization of variable input to constant output and mechanical and electrical control, for example, via hatch control, fine and coarse tuning control, and may use a constant speed motor, for example, operating at a multiple of 50 Hz (European) or 60 Hz (US) to generate constant voltage at constant frequency and the like. As the three variable gear assembly called a Transgear™ gear assembly has developed over time from Goldfinch to Hummingbird and the first Hummingbird after simplification, may differ from one to two gear assemblies and have been reduced in complexity to a single assembly with few moving parts as samples have been constructed and simplified. It is important to note that since a speed converter converts variable speed to constant speed and converts variable frequency to constant frequency, DDMotion's speed converter may be called a mechanical frequency converter or a "rotary frequency converter" as is called in the industry to differentiate from an electronically controlled variable power converter or variable frequency converter (VFC) or variable frequency drive (VFD).

In particular in wind and MHK turbines, it is suggested that there be an adjustment of the relative phase angular (radial) relationship between the rotor and stator in addition to the concept of adjusting the (axial) position lengthwise of a moveable rotor or stator in a variable torque and power generator (VT&PG) for variable torque and power with variable input velocity (typically rotational speed) and desired output electric frequency and voltage. This concept is especially useful for mechanical speed converters for synching the phase angle of variable input with, for example, a desired constant output velocity (convertible to electric power frequency, for example, at 60 Hz US and 50 Hz European) and constant voltage (but variable current depending on the wind/water velocity).

A further practical application of VT&PG is to provide a reciprocating input to a fixed torque and power generator (FT&PG) or a variable torque and power generator (VT&PG) for generating electricity with a reciprocating rotor. This concept eliminates a process of converting erratic motion of ocean wave energy, for example, to a rotary motion before generating electricity and may eliminate the need for Sprags from the speed converter(s) described in the priority patent applications and patents, and reduces cost, weight, size, and potential validation time. For the purpose of increasing the harnessed speed of reciprocating input or preventing the mechanical gearbox damage due to the sudden surge of power of reciprocating input, using magnetic gears or electromagnetic coupling instead of toothed gears may improve the durability of a gearbox without damaging the teeth. The magnetic gears of a magnetic gearbox (having no teeth) may intentionally slip (rather than break) in the event of a strong gust of wind or a strong water flow until a predetermined level of torque between magnetic gears is reached at which point the magnetic gears magnetically mesh with one another and do not slip (unless there is another strong gust of wind or strong water flow).

A further practical application of VT&PG is to use a VT&PG as a reactive speed controller by adjusting the torque or varying the load so that the waterwheel speed may be increased or decreased in a river/tidal/ocean wave/ocean current, marine hydrokinetic (MHK) turbine. In this embodiment, the VT&PG may increase or decrease torque by axially moving the rotor and stator relative to each other in MHK or wind turbines (or any variable load) for control of a waterwheel (or propeller/blades) or Hatch of such a MHK turbine. In a MHK turbine, the reactive torque control may be applied to control waterwheel speed until reactive control reaches a designed maximum and then Hatch control may be used for further waterwheel speed control with respect to desired output electrical power frequency and amount of current generated. A VT&PG may accept rotating or reciprocating input because the input change may vary positively or negatively from a reference value from an erratic energy source, for example, and may provide reactive control because the waterwheel reacts quickly to a load (or to a brake).

A variable torque and power generator (VT&PG) useful in all embodiments for controlling torque/rpm/power from a maximum to a minimum is shown in perspective view in FIG. 12, and in FIG. 13 (showing rotor and stator coupled magnetically or electromagnetically for minimum and maximum overlap). (There may be an infinite number of positions between minimum overlap 1360 and maximum overlap 1361 in a VT&PG but minimum and maximum overlap positions are shown by way of example). The utilization of a variable torque and power generator (VT&PG) as shown in FIG. 12 has been validated by the University of Maryland, Baltimore County, as a useful control device for controlling the torque, rotational speed, and power. When the available input torque at the cut-in speed is below the specified value to generate electricity, the VT&PG torque may be reduced, and when the provided input power is more than the specified rated power, the rated power of the VT&PG may be increased. In this case the power rating of the VT&PG has to be higher than the FT&PG (Fixed T&P Generator). Another way of using the embodiment is by adjusting the torque, the rotational speed of the harnessing device, a waterwheel or an assembly of wind rotor blades having parameters (such as propeller pitch or using a hatch) that may be controlled. For steady flowing streams and rivers, without much flow rate variation, a constant speed output can be easily produced by compensating the input. In wind and strong tide and ocean current turbine applications, considerable more control is required due to the more extreme variation, for example, in wind velocity from practically a calm wind to a high velocity storm wind so as to not break the meshed gear gearbox at the input. This may be rectified by using a magnetic gear comprising magnetic poles which will not breakdown. As shown in FIG. 2, 15 or 16, a magnetic gear of a magnetic gearbox (replacing mechanical gears with teeth), a variable torque and power generator (VT&PG), and a Goldfinch or Hummingbird speed converter or mechanical (rotary) frequency converter may be combined to provide a high efficiency, high power, low maintenance electric power generating system which is also scalable to different capacity needs. In later samples, hatch control is used more for installation, repairs, emergencies, and keeping the input flow speed range narrow to control constant speed output. Use of a constant speed motor may be used with the Goldfinch or Hummingbird models to achieve the improvements to constant speed/frequency and voltage control.

In alternative embodiments shafts and rotors may be connected to a pump, transformer, engine, generator or other device or wind or river/tidal/ocean wave/ocean current (MHK) turbine as discussed above. Note that in an alternative embodiment a rotor may be moveable with respect to the stator if needed to achieve minimum, medium and maximum torque and power (and any position in between). These variable torque and power generators (VT&PGs) may be added to an input compensating speed converter, for example, to output electric power to a grid at constant frequency.

In MHK turbines, for example, the VT&PG may be used to advantage regulating output shaft rotational velocity to a constant value.

Referring now to FIGS. 10A, 10B and 10C, there is shown a basic spur/helical gear assembly referred to herein generally as a three variable Transgear™ gear assembly or simply Transgear assembly. Such assemblies are also shown in FIGS. 3A, 3B (hatch control), 4A, 4B (hatch and speed control) and FIG. 5 (Transgear, motor and VT&PG control). Electronics of determining rotational velocity and deciding hatch control are described in connection with a description of a special purpose computer processor and memory control box in priority patent applications including FIG. 11 of US 2016/0010620 published Jan. 14, 2016, of Kyung Soo Han, incorporated herein by reference as to its entirety.

FIGS. 1 through 22 are provided by way of example to show the application of magnetic gears of a magnetic gearbox, a VT&PG in an MHK turbine, for example, for control of a hatch, output speed or electric current frequency to be relatively constant via a constant speed control motor and the various prototypes of a Goldfinch and Hummingbird three variable gear assembly (mechanical frequency converter) used to convert variable water and wind flow rates to match constant frequency and voltage rates for provision to an electric grid at varying current, dependent on water and wind flow speeds. Sample #3 and its simplified embodiments are controlled by a Hummingbird, a speed converter or a "mechanical (rotary) frequency converter." The same principles may be applied to both wind and MHK turbines to obtain constant output rotational velocity or electric current frequency and to adjust propeller pitch in comparison to variable wind velocities.

FIGS. 14A through 14F(1) and 14(F)2 show embodiments of an MHK turbine with a Hatch and waterwheel in various arrangements or applications of MHK turbines for use in rivers, tidal streams, ocean tides and ocean currents and the like so that the MHK turbines may be used to advantage whatever the direction of water flow height of wave action may be. Embodiments include bottom mount, top (for example, float) mount, side mount and a mount with a water vane to swivel the MHK turbine with variable direction of water flow.

These and other embodiments will be described with respect to the drawings, a brief description of which follows.

BRIEF DESCRIPTION OF THE DRAWINGS

FIG. 1 provides a corresponding perspective view of an exemplary MHK turbine 100, for example, located so as to receive water flow 110 from left to right in this embodiment and generate electricity.

FIG. 2A, FIG. 2B, FIG. 2C, FIG. 2D comprise drawings of a river turbine 100 and its components comprising, for example, a magnetic gear shown in FIG. 2B of a magnetic gearbox 104, to replace a mechanical gearbox which may be easily damaged by strong winds or water flow. FIG. 2C is a schematic of a three variable control which may be a speed converter or mechanical (rotary) frequency converter, a Goldfinch control or a Hummingbird control, as will be further described herein with an input, a control and an output variable. FIG. 2D is an introductory figure of a variable torque and power generator (VT&PG) which may be used for hatch and speed control as will be discussed further herein and to generate variable power from variable torque input by moving one of a rotor with respect to a stator.

FIG. 3A shows controls developed for turbines using Transgears where there is coarse or rough tuning and fine tuning for providing constant frequency and voltage power to an electric grid from a connected electricity generator 319. FIG. 3B shows a control built and tested for sample #1 of an MHK turbine to test the hatch control.

FIG. 4A shows controls of a MHK turbine having hatch 102 and VT&PG 415. Transgear assembly 403 is connected to a constant speed motor 491 and a gearbox 404. Gearbox 404 is connected to waterwheel shaft 302 and VT&PG 415, particularly showing another type of control, a hatch 102, the VT&PG 415, a constant speed motor 491, and a three variable gear assembly 403, namely, a Transgear gear assembly 403, for providing constant electric output control of an electricity generator VT&PG 415.

FIG. 4B shows controls built and tested for sample #2 of an MHK turbine 450 with control improvements to electric output control of constant frequency and constant voltage.

FIG. 5 of the present invention shows controls developed for sample #3 of an MHK turbine 500 having a control and generator module or C&G module comprising a three variable Transgear control 510 or a mechanical frequency converter control assembly called Hummingbird (referred to herein as a mechanical frequency converter) comprising first and second side-by-side Transgear gear assemblies 511, 512 and a constant speed motor 451 for outputting constant frequency electric power at constant voltage to an electric grid via VT&PG 491, a magnetic gearbox 505 for replacing a mechanical gearbox; (the generator 491 may be a fixed or variable torque and power generator 491). The details of converting variable to constant speed will be discussed with reference to FIG. 6.

FIG. 6 provides details of how a three variable side-by-side two Transgear control 600 (Hummingbird) can convert a variable speed input X+Δ from a waterwheel shaft 302 to a constant frequency and voltage output using a constant speed control motor 451 (not shown) having control speed rotational speed −X where Δ in the equations shown symbolizes the difference in rotational speed between the constant speed motor 451 and the input variable speed, for example, introduced at shaft 302 from a waterwheel 103 or from a propeller shaft.

FIG. 7A shows a schematic (developed by DDMotion) of a mechanical frequency converter for providing a three variable mechanical control, Hummingbird, using symbols for input, output and control variables as first shown in FIG. 2C. FIGS. 7B through 7G show one sequence of steps of simplification of side-by-side, two Transgear gear assemblies such as seen in FIG. 7B to a thin, simple, and efficient control gear assembly having a common sun gear in the middle of the shaft 741 in FIG. 7G, both the shaft and sun gear shown in cross-hatching.

FIGS. 8A and 8B show FIG. 7G, a simplified mechanical frequency converter comprising a three variable control, Hummingbird, in section A-A view and front view respectively having a Long Gear at top where FIG. 8B shows three sets of two planetary gears for meshing with three sun gears, left, middle, and right, with sleeves centered around a central input shaft, middle sun gear 741 connected to input shaft 302 with a larger attached or integral input sun gear 741.

FIG. 9A and FIG. 9B show a further variation of a Hummingbird three variable control 900 along section A-A utilizing a different type of planetary gear (Triple Gear shown at top), three different equally spaced, and different diameter planetary gear sets as best seen in FIG. 9A where a first set of planetary gears shown in FIGS. 9A and 9B as triple gears with different diameters and a second set of planetary gears shown in FIG. 9B both being one gear thick. Note the extension of shaft, sun gear 741 to, for example, waterwheel input shaft 302.

FIG. 10A shows a basic three variable spur gear Transgear gear assembly 1000 while FIG. 10B shows an assembly of FIG. 10A emphasizing the three variables only, two sun gears 1010, 1020 and a carrier 1030, while FIG. 10C represents a symbol for a Transgear gear assembly having a control, an input and an output which may comprise the three leads 1010, 1020, 1030 to the depicted symbol.

FIG. 11A (a mechanical frequency converter) is a layout of a two Transgear assembly 1100 and FIG. 11B (1) depicts a first schematic of a control developed using two Transgear assemblies side-by-side where the central waterwheel shaft 302 comprises the INPUT 1110, the bottom control shaft 1120 controlling the right sun gear of the left Transgear being the CONTROL and the OUTPUT 1130 being taken from the right sun gear of the right Transgear assembly. This configuration is shown in schematic form in FIG. 11B(1) using the Transgear assembly symbols corresponding in reference numerals to those used in FIG. 11A. FIG. 11B(1) may be further simplified as shown in FIG. 11B(2) showing sun gears 637 and control input 1120 reversed in the symbol and the input 1110 connects to back-to-back sun gears 637 and 739.

FIG. 12 shows a depiction of a variable torque and power generator (VT&PG) whereby one of a rotor and a stator may be moved axially relative to the other so as to control torque, speed, and power output of the stator given a variable input rotational speed of a shaft carrying a rotor. The greater the overlap of rotor/stator the greater the torque/power.

FIG. 13A shows a fixed torque and power generator (FT&PG), FIG. 13B and FIG. 13C show how the position of the rotor and stator of a variable torque and power generator (VT&PG) may be moved axially to produce minimum torque (minimum overlap) in FIG. 13B and maximum power rating (maximum overlap) in FIG. 13C. It may be noticed that a VT&PG may be larger than an FT&PG of FIG. 13A. A small servomotor may be used to move one (rotor or stator) with respect to the other, for example, via a worm and worm gear assembly. (See, for example, FIG. 4A).

FIG. 14A, FIG. 14B, FIG. 14C, FIG. 14D, FIG. 14E and FIGS. 14F(1) and 14F(2) show various mounting arrangements of a marine hydrokinetic (MHK) turbine: horizontal mount, floating platform, bi-directional flow, vertical mount to a river piling, a second bi-directional flow mount and a mount using a tail vane to maintain water flow 1401 in a direction so as to turn a waterwheel no matter what the direction of water flow 1401.

FIG. 15A provides a cut-away view of a wind turbine showing component parts replacing known, less reliable components wherein FIG. 15B shows a magnetic gear for replacing mechanical gears of a mechanical gearbox, FIGS. 15(C)1 and 15(C)2 show a speed converter (either one), a Goldfinch and a simplified Hummingbird three variable control respectively, for replacing electronic power converters which tend to break down, and FIG. 15D shows a constant speed and variable torque and power generator (VT&PG) which produces more electricity replacing a less efficient variable speed generator. The proposed wind turbine shown in FIG. 15A in cut-away view may be reliable, scalable and efficient.

FIGS. 16A(1) and 16A(2) are views of vertical axis wind turbine (VAWT) (variable wind flow direction top and side views), 16B(1) and 16B(2) (Goldfinch and Hummingbird mechanical frequency converter control), 16C (a magnetic gear of a magnetic gearbox for slipping in the event of strong wind gusts), and 16D (VT&PG) show that the same system shown in FIG. 15A for a horizontal axis wind turbine (HAWT) may be applied to a wind or MHK turbine according to the present invention of combining a magnetic gearbox, one of a Goldfinch or a Hummingbird control, and a constant speed VT&PG (variable torque and power generator).

FIG. 17 provides a graph 1700 of how more wind energy may be harnessed utilizing a variable torque and power generator (VT&PG) according to the present invention such that the cut-in speed (water or wind) may be lowered (increasing, for example, the wind speed range of operation) and the rated speed and rated power may be increased to harness more power over a greater range of wind (or water) velocity.

FIG. 18 provides a layout of a marine hydrokinetic river turbine (MHK river turbine) according to Sample #3 of the present invention having a water power harnessing module 1810 comprising a waterwheel and hatch whose shaft via input shaft 302 may drive, via a magnetic gearbox (not shown), a C and G module 1820, a Hummingbird or a mechanical (rotary) frequency converter 1830 for converting variable to constant speed using a constant speed control motor 1840 as the control input and a variable torque and power generator (VT&PG) 1850 for producing a constant frequency and voltage electric output.

FIGS. 19-22 provide various options for powering the constant speed control motor 1930 of FIG. 18 where FIG. 19 shows using grid power when available and FIGS. 20-22 show options 1-3 when there is no grid power available.

FIG. 19 suggests using grid power when grid power is available;

FIG. 20 suggests a first option where there is no grid power using generated power from the MHK turbine having a VT&PG powering AC motor 2050 via power supply 2030 when grid power is not available;

FIG. 21 a second option when grid power is not available uses VT&PG powering AC motor 2050 via power supply 2030 where the Hummingbird control is a different configuration;

FIG. 22 shows no grid power option 3 and an alternative use of an alternator of DC generator 2220, charge controller 2230 and a battery 2240 for DC control motor 2250.

DETAILED DESCRIPTION

In the figures of the present embodiments of the invention, an effort has been made to follow a convention such that the first reference number such as 1XX indicates figure number where the element first appears, for example, Hatch 102 first appearing in FIG. 1. Similar reference numerals are used in the Figures to represent similar elements.

Referring now to FIG. 1, FIG. 1 provides a corresponding perspective view of an exemplary MHK river turbine 100, for example, located so as to receive water flow 110 from one direction (such as left to right) and generate electricity via generator (not shown) attached to the output shaft 105 of the control box 104 leading to the generator (not shown). The MHK river turbine 100 may have a sloped block 101 for channeling the water flow 110 toward a hatch 102 which is shown in a partially closed position with respect to a waterwheel 103. The waterwheel 103 will turn more freely if the hatch 102 is fully open and exposes the waterwheel 103 to the entire water flow. The hatch 102 may have an associated hatch control as described, for example, in FIGS. 3A, 3B and 4A, 4B, and pending patent applications and issued patents and generator control wherein a waterwheel 103 is turned by water flow in proportion to water velocity (faster water flow, faster waterwheel rotational velocity and higher electricity output of the generator). The Hatch control may open or close the hatch 102 to an infinite number of positions over the waterwheel 103 so that maximum or appropriate water flow will drive the waterwheel 103, and a generator (not shown) driven by a gearbox 104 (preferably using magnetic gears) showing output 105 and mechanical speed controls 104 (a mechanical (rotary) frequency converter having three variable controls referred to herein as the Goldfinch or Hummingbird) and a variable torque and power generator (VT&PG) (or fixed torque and power generator, FT&PG) produce output power at a desired constant frequency to a power grid regardless of input water flow rates from the specified minimum to the maximum. The output shaft or any shaft coupled to the waterwheel may comprise the VT&PG of FIG. 12 or 13B and 13C (briefly described below). The rotor 1202 and stator 1203 may be variably positioned with respect to each other to regulate the output to produce a constant frequency such as 60 Hz (US) or 50 Hz (European) for power generation having constant voltage but current variable with amount and speed of wind/water flow and the turning velocity of the input waterwheel 103. Referring to FIG. 1, FIG. 1 provides a better view of how an MHK turbine may be placed bottom-mounted at the bottom of a river or stream or on the ocean floor or platform to receive ocean current. See FIGS. 14A through 14F(2) for various mounting arrangements of an MHK turbine for capturing single direction water flow and two directional tidal energy. As shown in recently allowed patent application U.S. Ser. No. 14/838,867, filed Aug. 28, 2015, a run-of-river turbine also known as a marine hydrokinetic or MHK turbine is also described in priority U.S. patent application Ser. No. 14/255,377 of Kyung Soo Han filed Apr. 17, 2014, now U.S. Pat. No. 9,151,269, in two forms, herein called samples, which have been built and tested. The MHK turbine 100 may be allowed to rotate with a bi-directional tidal flow so as to always face the direction of tidal flow; (see, for example, FIG. 14C, FIG. 14E or FIGS. 14F(1) and 14F(2)).

Referring again to FIG. 1, a ramp called ramp block 101 receives water flow 110, and the water flow may be channeled over a horizontal plane (between block 101 to hatch 102 shown in a partially closed position to allow the water flow to turn waterwheel 103. A gearbox and controls 104 (which may comprise a special purpose programmed controlled processor in combination with a mechanical frequency converter or three variable speed converter and/or a variable torque and power generator) regulates the variable rotational velocity of waterwheel 103 to a desired constant rotational velocity of output shaft 105 for driving an electric generator 105 (not shown) for feeding power to an electric power grid. As described below, this MHK turbine may be controlled in the manner described with reference to FIGS. 3, 4, 5, 6, 7, 8, 9, 11, 12, 13A-13C and 18 of the present patent application and FIGS. 5, 6, 7, 8, 9, 10 and 11 of priority patent application U.S. Ser. No. 14/838,867 filed Aug. 28, 2015, now allowed and incorporated by reference as to its entire contents.

Referring again to FIG. 1, FIG. 1 may show channeling the water flow toward a Hatch 102 via guides (not shown) where the hatch 102 is shown in a partially closed position with respect to a waterwheel 103. The waterwheel 103 will turn more freely if the hatch 102 is fully open and exposes the waterwheel 103 to the entire water flow and the guides help direct the water toward the waterwheel and increase the water flow speed. The Hatch 102 has an associated Hatch control as described in FIGS. 3 and 4 and pending patent applications and issued patents and generator control wherein a waterwheel 103 is turned by water flow in proportion to velocity (faster water flow, faster waterwheel rotational velocity). Thus, the waterwheel 103 is scalable and can react to varying rates of water flow when mounted, for example, on a platform at the bottom of a river of relatively constant speed (for example, per horizontal mount FIG. 14A). The Hatch control may open or close the Hatch 102 to an infinite number of positions over the waterwheel 103 so that maximum or appropriate water flow will drive the waterwheel 103, and an electric power generator 105 driven by a gearbox and mechanical speed controls 104 produces output power at a desired constant frequency to a power grid regardless of input river or stream water flow rates. The output shaft or any shaft coupled to the waterwheel 103 may comprise the VT&PG of FIG. 12 or 13 (briefly described below). The rotor and stator may be fixed or variably positioned with respect to each other to regulate and to produce a constant frequency such as 60 Hz or 50 Hz for electric power generation having constant voltage but current variable with amount of water flow and the turning velocity of the input waterwheel 103. Not shown is a typical three variable to constant speed converter for assuring that the variable input (waterwheel rotational velocity) is converted to a constant velocity via either hatch control, using a constant speed motor or both as will be explained herein. This mechanical speed converter or rotary frequency converter is easily differentiated from an electronic device, power converter or variable frequency converter, which converts harnessed variable power to constant, may have a limited power range and a high failure rate.

FIGS. 2A-D provide details of the several components of a Marine Hydrokinetic (MHK) turbine 100 shown in greater detail according to the present invention with the exception of the use of a variable torque and power generator (VT&PG) which may also be used to generate more electricity and regulate speed to a constant speed from a variable speed by regulating torque. FIG. 2A shows a perspective view of an embodiment of an MHK turbine 100 similar to the embodiment of FIG. 1 mounted, for example, to a river bed platform 207 having sloping block 101 for receiving water flow 110 from the left, a flat or horizontal planar top 202 and a Hatch 102 (which may be opened, partially closed or fully closed) for covering the waterwheel 103 depending on the speed and amount of water flow 110. Water flow guides (channels or protectors) are not shown which may be configured to cause water flow to be harnessed from the sides and channeled at higher speed to the waterwheel (discussed and shown in priority patent applications).

In FIGS. 3A, 3B and FIGS. 4A, 4B, two embodiments are shown which utilize hatch control, where FIG. 3B may be a portion of FIG. 3A and FIG. 4B may be a portion of FIG. 4A. All of FIGS. 3A, 3B and FIG. 4A, 4B have been described in priority patent applications. A partially closed hatch 102 (FIG. 1) position permits the most water to be received by waterwheel 103. In constant flowing rivers and streams, for example, hatch 102 may remain most of the time in an open position and be constantly turning to produce a constant speed (except when there is a storm or other exceptional condition) when the water changes flow rate. The hatch 102 will close more according to FIGURE's 3A, 3B and 4A or 4B as water flow rate increases. The water flow will be drawn up over the open or partially closed hatch 102 and still turn the waterwheel 103, for example, at constant velocity in a fast current or flooded condition. In a severe storm condition, a maximum closure position may be used to fully protect the waterwheel 103 and mechanical gearbox 104 (preferably a magnetic gearbox) from damage by floating debris or high velocity water current which may damage the waterwheel 103. The use of magnetic gears in a gearbox can alleviate this issue. This maximum specified closed Hatch position may still permit the waterwheel 103 to turn and operate to produce electric power, but it is desirable to lock the waterwheel 103 (close the hatch) during installation or maintenance using a fully closed position. Concerning marine life protection, closed blade waterwheels may be used. Note that, with closed blade waterwheels, fish swim over the waterwheel, not through, and there are slim chances that the fish may be caught in the waterwheel 103.

The gears in the gearbox 104 may be damaged by sudden power change due in heavy rains carried by water flow 110 and by wind storms. Shown in FIG. 2B is a typical magnetic gear which may comprise a shaft or pin at its center and inner magnetic gear 220 turns outer magnetic gear 230 having air gaps and alternating N/S permanent magnets used as an alternative to prior art meshing of mechanical gears such that the magnetic gears of gearbox 104 can slip as they turn when the waterwheel 103 is hit by debris or high water flow rates and the magnetic gears are held in each position of slippage by permanent N/S permanent magnets between the slipping gears so that a gearbox 104 of such gears receiving the full thrust of a stopping input shaft will not have their meshed gears break requiring the gearbox 104 to be replaced. A predetermined level of torque between magnetic gears may be reached and the gears start to slip with respect to one another. This slippage, of course, is preferable to breakage of the meshing of mechanical gears. The magnetic gears will again catch one another and stop slipping as the gears N/S magnets grasp one another again.

FIG. 2C shows a schematic of a mechanical (rotary) frequency converter comprising a three variable gear assembly converting variable to constant speed/frequency output comprising an input, an output and a control of the variable input to be a constant speed output. This symbol is first introduced in this patent application by inventor Kyung Soo Han to represent three variable gear assemblies which Mr. Han has named a Goldfinch control assembly and a Hummingbird control assembly in various embodiments as will be explained further herein are introduced and simplified herein as well.

FIG. 2D shows a perspective view of a Variable Torque and Power Generator (VT&PG) when used in an electric power generator to control torque and power to provide a constant speed when an input is of variable speed. The rotor and the stator are movable axially in relation to one another such that when there is maximum overlap, there is maximum torque between rotor and stator. Minimum torque is applied between rotor and stator when there is minimum overlap between rotor and stator. Such a minimum overlap might be used in a slow or low wind situation to lower the cut-in speed and generating more electricity. A maximum overlap might be used in an extremely high wind or fast river flow situation to increase the rated speed or rated power and generating more electricity. In summary, operation over a greater range of wind and water speed will be demonstrated using the present invention to generate more electricity and to lower the level of energy cost or provide a level cost of energy (LCOE).

FIG. 3A of the present invention provides a cross-sectional view of five basic spur/helical gear three variable Transgear™ gear assemblies 300 showing the various controls developed for an MHK turbine showing, in combination, hatch control, coarse or rough tuning control, and fine tuning control primarily as hatch control. A VT&PG may also be used to regulate variable to constant speed (not shown) in series with the control (not shown). The constant speed MHK turbine comprises hatch control gear assemblies 308 and 310 for controlling hatch 303 of waterwheel 301 via shaft 302. There is coarse control 308, 310 including a first worm and worm gear assembly (not labeled) and a fine tuning control assembly 311, 312 shown connected to an electric power generator 319 for delivering power to an electric grid via connecting gears assembly 315, 316 and 317 for driving the generator 319. A simpler design of hatch control using a pair of spur gear assemblies and a single worm and worm gear assembly is shown as FIG. 5 of U.S. Published Patent Application 2016/0010620, allowed, (FIG. 3B of the present application) wherein the worm gear and worm gear assembly are described in greater detail for regulating torque between rotor and stator. These embodiments rely on three VARIABLE rough and coarse tuning of a hatch control for controlling generator speed with a VT&PG. FIG. 3B, a portion of FIG. 3A, coarse tuning or hatch control, provides a cross-sectional view of hatch control which has been built and tested for sample #1.

Referring to FIG. 5 of the US 2016/0010620 published patent application (FIG. 3B of the present patent application) shows a top view of a simpler MHK turbine. FIG. 5 (shown as FIG. 3B with slightly different reference numerals herein) provides a mechanical diagram of a Hatch control of Hatch 102 over waterwheel 103 with just two sets of Transgear gear assemblies and one worm/worm gear assembly 314, 316. Waterwheel shaft 302 is extended and two gears 304 and 305 are attached to or integral with the shaft 302 and mesh with each respective gear assembly. Control of the first Transgear gear assembly is carrier 308 and control of the second Transgear gear assembly is sun gear 310. The output of the two Transgear assemblies is carrier 309. The output controls the hatch 102 through gear 313 attached to shaft 311; worm 314 is also attached to shaft 311, meshes worm gear 316, and bevel and spur gear 317, and spur gears 318 and 319 in turn.

An embodiment (FIG. 4A of the present patent application) of a hatch and motor control including a variable power generator and a constant speed motor is shown as FIG. 11 of US 2016/001620, now allowed, (with different reference numerals) wherein the hatch opening and closing is controlled at pin #3 of the control board, the grid power is output at pin #4, control of a rotor with respect to a stator of a VT&PG is controlled by pin #2 and #5 and the gearbox 404 may comprise magnetic gears according to the present invention; (the magnetic gear feature was not disclosed in US 2016/001620). The constant speed motor is 491 driving shaft 411 for output to sleeve 420 including attached or integral sun gear 430. Sun gear 430 is coupled to the spur/helical gear assembly 403 (unnumbered in FIG. 11 of the allowed patent application). The other sun gear 410A, integral or attached to shaft 410, meshes with gear 408 via an intermediary gear and carrier 407. A worm and worm gear assembly 406, 470 via carrier bracket gear 407 connects to pin #1 for hatch and VT&PG control.

FIG. 4A of the present patent application (and FIG. 11 of the '867 patent application of Kyung Soo Han) show a Transgear-controlled Variable Torque and Power Generator and Hatch 400. FIG. 4A may comprise a diagram of a Transgear-controlled variable torque and power generator (VT&PG) 415 with the rotor 452 of the VT&PG integral to or attached to output shaft 401 shown displaced from the stator 453 by way of example. The input shaft 302 integral with or connected to the waterwheel 103 may have variable speed and the VT&PG output shaft 401 for driving the variable torque and power generator 415 may be governed to provide constant output electric power frequency at port #4 of control box 435 by sensing the grid power output at stator output 455 for voltage and frequency. The three variable Transgear assembly 403 (or more variable Transgear assemblies) further controls the output electric power to constant frequency via the VT&PG 415 regulated by constant speed motor 491, Transgear assembly 403, worm 406 and worm gear 470.

FIG. 4A further shows an example of a speed converter that may be spur/helical gear Transgear assembly 403 controlled (where the number of variables is three or more) having VT&PG 415 for regulating output to a required output angular velocity (rpm) for generating power. Input to waterwheel shaft 302 will be split into two circuits after, for example, increasing the input speed by a gearbox 404 (which may comprise magnetic gears which may slip but not break in events such as high wind or strong water flow) to achieve a higher rotational velocity of shaft 410: into a power circuit driving a VT&PG shaft 401 and having a control circuit 435 receiving input to VT&PG 415 via left sun gear 410A of Transgear assembly 403. Right sun gear 430 of Transgear assembly 403 will be rotated by a shaft 411 of constant speed control motor 491 turning second sleeve sun gear 430 via sleeve gear 420. When the rpm of left sun gear 410A is not the same as the rpm of right sun gear 430, Transgear assembly output, carrier gear 407, will adjust the stator 453 of the VT&PG 415 after processing through a worm 406 and worm gear 470.

Starting from upper left, waterwheel shaft 302 is connected to the gearbox 404 (preferably magnetic gears). The gearbox output turns left sun gear 410A and gear 419 through gear 417. Gear 419 is attached to VT&PG input shaft 401 for generating power. Also, sheath/sleeve 418 turns right sun gear 430 integral with or attached to sheath 418. Gear 420 is meshed with a gear integral with or attached to constant speed motor shaft 411 of control motor 491. If the input rpm 410 or 410A to Transgear 403 is the same as the control rpm of gear 430, there will be no adjustment/output. If the input rpm 410 or 410A is faster or slower than the control rpm of gear 430, stator 453 will be adjusted (via carrier 407, worm 406 and worm gear 470) and the constant frequency output current 455 by VT&PG 415 to an electric power grid 440 will be produced.

FIG. 4A of the present application (FIG. 11 of the '867 patent application) also shows a control schematic of a DDMotion River/tidal/ocean wave/ocean current Turbine (also known as a Marine Hydrokinetic (MHK) turbine). A run-of-river turbine also known as an MHK turbine is also described in priority U.S. patent application Ser. No. 14/255,377 of Kyung Soo Han filed Apr. 17, 2014, now U.S. Pat. No. 9,151,269. Both a Transgear gear assembly and a variable power generator are shown.

Moving on to FIG. 4B of the present application, a complete MHK turbine 450 with a magnetic gearbox (not shown), generator 491 controlled by a Transgear assembly 440 is shown using a constant speed motor 451 to control electricity generation. The Transgear assembly 440 output 445 through carrier bracket 442 controls the hatch 102. The controlled waterwheel shaft output gear 441 is connected to generator input gear 421.

FIG. 4B, furthermore, of the present invention is a diagram of the controls developed for a sample #2 of an MHK turbine developed to utilize both hatch control and constant speed motor 451 control of a variable speed MHK waterwheel 103 and to produce a constant RPM generator 491 (VT&PG) via the constant speed motor 451 control of a three variable spur/helical gear assembly 440. A magnetic gear gearbox 404 is shown between the waterwheel 103 and the output gear 441 and, sample #2 may use a fixed torque and power generator in place of a VT&PG 491. The constant speed motor 451 has a shaft for turning a right sun gear and sleeve 446 which engages spur/helical gears 443A and 443B mounted on pins 444A and 444B having planetary gears integral with the pins for controlling a constant speed sun gear 441 of the input shaft 302. The input is shaft 302 via gearbox 404; the output is both at 445 for hatch control and at gearbox output gear 441 for driving gear 421 of the electric generator 491 for delivering electric power to the electric grid via shaft 411.

Sample #3 and an introduction to a Hummingbird control will be discussed with reference to FIG. 5. As a preliminary discussion, a point to be made in FIG. 5 is that the mechanical frequency converter control system of a Hummingbird with a constant speed motor 451 control input can produce a constant speed output while the waterwheel shaft 302 speed of waterwheel 103 is variable. A magnetic gearbox 505 is located between the waterwheel shaft and the entry to a Hummingbird. In fact, a magnetic gearbox is preferred to a mechanical gearbox because magnetic gears may slip in the event of gusts of high wind or bursts of water flow until the magnetic gears 505 grip again once a predetermined level of torque between them is reached. It can be seen that the embodiment of an MHK turbine of FIG. 5 shows no control of hatch 102 of waterwheel 103 or the adjustment of VT&PG (generator) 491. Actually the hatch 102 may be controlled to minimize the speed variation and also it will be closed automatically during the emergencies or closed manually during installation or for repairs. The VT&PG 491 rotor/stator overlap will be adjusted to control the waterwheel rpm as a feedback control and to generate more electricity. The waterwheel 103 mounted on shaft 302 without the extended shaft portion 302 into magnetic gearbox 505 and then to control 510 (comprising Hummingbird control dual Transgear assemblies 511, 512) may have its own housing separate from a housing containing control 510 and an electricity generator 491 (VT&PG) (sometimes referred to herein as a C&G module; (see FIG. 18). So the left hand side of FIG. 5 may be called the "harnessing module" and the right hand side of FIG. 5 may be called the "C&G module" (for control and generation). The "harnessing module" may harness water flow (shown) or wind, via a vertical or horizontal axis wind turbine (VAWT or HAWT). A vertical axis wind turbine or a horizontal axis wind turbine may utilize the principles of the present invention for variable to constant speed control. A vertical axis wind turbine has been argued to be preferable to a horizontal axis wind turbine due to installing the heavy components on the ground level and easier to maintenance the components that may be located at ground level rather than vertically up in the air above the earth near the large propeller.

The harnessing module of FIG. 5 (left hand side) has already been discussed and comprises a hatch 102 receiving a water flow 110 from the top of the drawing, the hatch 102 for typically regulating the flow of water to waterwheel 103. In Sample #3, however, the hatch 102 may be automatically controlled during emergencies but may be closed manually during installation or repairs. The hatch 102 may not be a direct contributor to variable water or wind control to constant output speed control but will be controlled to minimize the range of speed variation. To the contrary, a so-called Hummingbird control, in this embodiment, comprising two Transgear spur gear assemblies side by side 510 having a control variable provided by the constant speed motor 451, a variable input 302 provided by the wind or water flow power harnessing module. The control assembly 510 is protected from heavy winds and unusually rapid water flow by magnetic gearbox 505. Moreover, a variable torque and power generator (VT&PG) and magnetic gear gearbox 505 may be used as a part of the C&G module in addition to conventional propeller pitch control or the use of a hatch to regulate waterwheel reaction to rapid water flow. In FIG. 5, waterwheel 103 provides an input variable at shaft 302 to magnetic gearbox 505 and then to a Hummingbird controller 511, 512 (mechanical (rotary) frequency converter). Shaft 420 turns electric power generator VT&PG 491 while the control is provided by the constant speed motor 451 and, optionally, a VT&PG (of generator 491). A discussion of FIG. 5 will now be continued with a discussion of FIG. 6 which explains the control provided by the constant speed motor 451 and the dual gear assembly 3V (three variable) Hummingbird control embodiment 510, which may involve the VT&PG.

Referring now to FIG. 6, there is shown a Hummingbird two-Transgear assembly control 600 (mechanical frequency converter) having three variables representing control 510 of FIG. 5 provided by a constant speed motor 451. First, we introduce the three variables of control 510 of FIG. 5 or the embodiment of FIG. 6. A control input −X may be a constant rotational velocity −X which, for example, may be a multiple in RPM of the standard European electrical frequency of 50 Hz (cycles per second) or the US electrical frequency of 60 Hz and output as RPM rotational speed by a constant speed motor 451 (which may have a gearbox for increasing/decreasing the constant speed). For example, −X may be a value from 600 RPM to 3000 RPM CCW. Now, a variable portion of the speed input is received from a waterwheel or a VAWT or HAWT which may represent a + or −Δ (variable change) in rotational speed in RPM when compared with the value of X output by the constant speed motor control variable X. So variable input X+Δ or X−Δ is received at shaft 302. Assuming that the Input to left sun gear 637 of left Transgear=X+Δ (representing a positive change in speed) then, carrier #1 630=(X+Δ)−X=+Δ (provided by the constant speed motor 451 and the net result is +Δ). On the other hand, by the Transgear rule, Carrier #2 631=−Δ. Meanwhile, second sun gear (left sun gear of right Transgear) 638 is also an input X+Δ and meshes with planetary gears 643a and 643b on pins 644a and 644b. Thus, the output to electric power generator (right sun gear of right Transgear) 411= (X+Δ)−Δ=X, the desired constant speed output fed to electric power generator 420 which value is the same X as the constant speed motor 451 rotational speed.

The mechanics are that when the input is to the first sun gear (left sun gear of left Transgear) 637 and the control input is to the right sun gear of left Transgear 451, and when the two input speeds are not same, turns carrier #1 630 which carries planetary gears 641a and 641b which turn on pins 642a and 642b. Connecting gear 635 connects two carriers 630 and 631. The difference+Δ produced by carrier #1 630 from the first gear assembly (left Transgear) is carried to carrier #2 631 where mathematically Carrier #2=−Δ according to the Transgear rule. Meanwhile, left sun gear 638 of right Transgear is also an input X+Δ and the carrier #2 631 becomes the control input −Δ. The output of the right Transgear or right sun gear of right Transgear 411 or to the electric power generator 420 is (X+Δ)−Δ=X. This two-Transgear Hummingbird having many components may be simplified as will be discussed with reference to FIG. 7A-7G.

FIG. 7A provides a symbol for the two side-by-side Transgear assemblies of FIGS. 5 and 6 with the control input from a constant speed motor entering from the left, the input from a variable speed VAWT, HAWT or MHK turbine shaft varied typically by a magnetic gear (gearbox) entering from the top, and the output to an electricity generator outputting from the right. FIG. 7B is identical to control 510 of FIG. 5 and Hummingbird control 600 of FIG. 6. FIG. 7B may be modified to its mechanical equivalent FIG. 7C by swapping positions of input gear (left sun gear of left Transgear) 637 and control gear (right sun gear of left Transgear) 638. Now re-numbered the input gear from before 637 to now 737 and the control gear from before 638 to now 738. FIG. 7C may be further simplified to its mechanical equivalent FIG. 7D by using longer pins to attach two Transgear carrier gears (connecting gear 635 is no more necessary and four carrier gears become circles or brackets or without gear teeth). FIG. 7D may be further simplified to its mechanical equivalent by reducing the redundancy, for example, the two input sun gears 737 and 739 into one central sun gear 741 and two sets of planetary gears into one set (at top and bottom). The two sun gears 737 and 739, one on the left and one on the right, in FIG. 7D may be reduced to one central sun gear 741 as shown in FIG. 7E to FIG. 7F. When the diameters of two sun gears 738 and 740 are reduced to 738A and 740A so that they do not accidentally mesh with planetary gear 750, as shown in FIG. 7F, the assembly may have a narrower profile now by pushing the two smaller sun gears 738A and 740A toward the center sun gear 741 of the shaft as shown in FIG. 7G. All FIGS. 7B-7G are Hummingbird in different shapes and may be presented by a schematic shown in FIG. 7A. Other simplifications than those shown may be made by one of ordinary skill in the art to the embodiments of FIGS. 7B-7G without varying from the scope of the invention.

FIG. 7G is derived from FIG. 7F by simply removing excess space from between the gears, shafts, carriers and pins of FIG. 7F. FIG. 7G is simply a more condensed combination of simpler designs than those of FIGS. 7B-7F.

FIG. 8A provides a section view of a simplified Hummingbird three variable control 800 as seen in front view in FIG. 8B. FIG. 8B in turn is taken from a simplified, condensed three variable Hummingbird control taken from FIG. 7G. Note the Long Gear at the top center. FIGS. 9A and 9B show a Triple Gear at the top center. FIGS. 8B and 9B show three sets of two planetary gears equally spaced around central sun gear and integral or attached carrier with the bottom planetary gear sets meshed with the sleeve and the top planetary gear set meshed with the central sun gear respectively. It is optional to have more or fewer number of planetary gear sets as needed. A cautionary detail about the number of planetary gears meshing with a sun gear may be useful for the number of teeth on each gear of a set of gears. If the number of planetary gears meshing with a sun gear is more than one, for example, three planetary gears, the number of sun gear teeth should be a multiple of the number of planetary gears. For example, if there are three planetary gears meshing with a sun gear, the gear teeth should be the multiple of three (3). Four gears should have a multiple of four (4) teeth.

FIGS. 9A and 9B show a Triple Gear variation 900 of Hummingbird shown in FIGS. 7G or 8A and 8B. A major difference is the planetary gears shown in FIG. 9A are triple gears with one large gear in the middle and two smaller diameter gears on the left and right sides. FIG. 9A is functionally equivalent to other Hummingbird embodiments but has three sets of triple gear planetary gears. The central shaft 302 comprises the input and has a sun gear 741 meshing with the planetary gear set at top. FIG. 9B shows the three sets of equally spaced planetary gears of different diameters including one triple gear in each planetary gear set of two gears each. It is optional to have more or a fewer number of planetary gear sets as needed. A cautionary detail about the number of planetary gears is the number of teeth on each gear. Again, as suggested above, if the number of planetary gears meshing with a sun gear is more than one, the number of gear teeth should be a multiple of the number of planetary gears. For example, if there are three planetary gears meshing with a sun gear, the gear teeth should be a multiple of three (3). Another cautionary detail about the multiple sets of double, triple or multiple gears meshing with a single sun gear is that they may have to have teeth alignment. For example, it is more obvious when one of the smaller (planetary) gears is meshing with a common sun gear. If they are not aligned, they may not mesh properly. A solution may be to use the same number of teeth for both large and small gears but with different pitches of teeth.

FIGS. 10A, 10B and 10C show the steps of developing a simple symbol shown in FIG. 10C for the various three variable spur/helical Transgear gear assemblies shown in this and priority patent applications and patents. Referring to FIGS. 10A and 10B, the figures provide a more complex and a simple view of a basic spur gear three variable Transgear™ gear assembly having a sheath/sleeve integral with or attached to a left sun gear (which may be a first assigned variable, input, output or control). In this embodiment the gear assembly may be three gears wide. On the other hand, if carrier gears are carrier gears, the assembly may be five gears wide (not shown). A first assignable variable may be the first sun gear. A second assignable variable may be the carrier. A third assignable variable may be the second sun gear. There are also shown a set (pairs) of two planetary gears. FIG. 10A shows a layout of a basic three variable spur gear assembly showing variables 1010, 1020 and 1030 and FIG. 10B shows a basic spur gear assembly showing the same three variables without planetary gears, two sun gears 1010 and 1020 (one on a sleeve, the other attached or integral with the carrier) and a carrier 1030 (for the planetary gears). The simple symbol of FIG. 10C shows an input, an output and a control variable of a simple three variable spur/helical gear assembly, the symbol representing two sun gears 1010, 1020 in triangles and a carrier 1030 represented as a zig-zag line in the middle totaling the three variables.

FIG. 11A is a Hummingbird 1100 mechanical frequency converter similarly as shown in FIG. 6 or FIG. 7B. A Hummingbird may be represented by using the Transgear assembly symbols and is shown in FIGS. 11B(1) and 11B(2). As can be seen in FIG. 11A, a variable input 1110 is provided to two sun gears 637 and 739, a control input 1120 is provided to right sun gear of the left Transgear assembly, and an output 1130 is seen in FIG. 11A. FIG. 11A may be symbolically presented as shown in FIGS. 11B(1) and 11B(2). The symbol of FIG. 11B(1) greatly simplifies the two Transgear assembly of FIG. 11A. FIG. 11B(1) is drawn to physically match the layout of FIG. 11A, but the schematic may be simplified. In FIG. 11B(2) note that the symbol is further simplified such that the two input sun gears 637 and 739 are shown back to back with input 1110 connected between them. In this case the schematic presents the circuit, but the physical layout of gears is not indicated.

FIG. 12 is a perspective view (an exaggerated view to emphasize the variable overlap of rotor 1202 and stator 1203) of a variable torque and power generator (VT&PG) 1200 showing a shaft 1201 which may integral to or fixedly attached to the rotor 1202 displaced at a minimum/maximum overlap (or any position in between) or torque position from a stator 1203 (minimum overlap shown), a means of moving the rotor 1202 to a maximum position being, for example, a motor (not shown) such as a servo motor under feedback control to match desired torque with desired shaft 1201 rotational velocity.

FIGS. 13A, 13B and 13C provide an overview mechanical diagram of a Variable Torque and Power Generator (VT&PG) 1350 where FIG. 13A represents a fixed overlap embodiment 1300 with no adjustability between shaft 1301, rotor 1302 and stator 1303. This FIG. 13A will be called a Fixed Torque and Power Generator (FT&PG) or Fixed Overlap Generator (FOG). FIGS. 13B and 13C represent VT&PG embodiments 1350 where rotor 1352 and stator 1353 may be displaced from one another or entirely overlap one another for maximum torque and power. When generating power for a grid which may be continuously adjusted from minimum to maximum torque (through an infinite number of positions), FIG. 13B shows minimum overlap 1360 between a shaft 1351/rotor 1352 and a stator 1353 and FIG. 13C shows maximum overlap 1361 (maximum torque/power) between a rotor 1352 and a stator 1353. To minimize the cut-in speed (torque for FIG. 13B is lower than that of torque for FIG. 13A) and to maximize the energy harnessing, the rated power of FIG. 13C is higher than that of the rated power of FIG. 13A or 13B), the generator rotor and stator overlap is continuously controlled, for example, by sensing input shaft rotational velocity, torque on the shaft 1351 and, via feedback, moving the stator 1353 with respect to the rotor 1352, for example, via a motor (not shown) to appropriately match variable input and desired constant output electric power frequency at output 1353 to an electric grid (FIGS. 13B and 13C). The physical size of VT&PG FIGS. 13B and 13C may be bigger than FT&PG embodiments shown in FIG. 13A.

FIGS. 14A-14F(1) and 14(F)2 show several mounting options for an MHK turbine of the present invention. FIG. 14A shows a side view of a first arrangement for mounting an MHK turbine for receiving water flow 1401 from the left as a bottom mount (for example, on a river bottom platform), and FIG. 14B shows a side view of a second arrangement for top mount (for example, from a floating platform, a boat or the bottom of a dock). Water flow 1401 is assumed to be flowing in one direction from left to right, but the drawings may be reversed and water flow be from right to left.

FIG. 14C shows a side view of an arrangement of first and second MHK turbines for receiving water flow 1401 from the left (shown) and with the hatch closed of the right MHK turbine. When, for example, the tide flows from right to left, the right hatch is opened and the left hatch is closed so the arrangement of FIG. 14C is bi-directional. A further bi-directional arrangement of MHK turbine is shown in FIG. 14E (side mount) where when water flows from left to right, the top (or left) hatch is open and the bottom (or right) hatch closed. The bi-directional flow MHK turbine may be mounted to a piling top as a right side mount and a left side mount; (these turbines may be mounted to the left and right sides of a bridge piling, a dock piling, an underwater wall confining, for example, a canal or stream). A vertical mount for mounting vertically to a river bridge piling or the side vertical poles of a dock is seen in FIG. 14D. The arrangements of FIGS. 14F(1) and 14F(2) are capable of swinging with the water flow 1401 as the water turns the MHK turbine toward the water flow via the water vane for sensing direction of water flow 1401. The MHK turbine may be mounted horizontally or vertically, for example, a piling top as a right side mount or a left side mount; (these turbines may be mounted to the left and right sides of a bridge piling, a dock piling, an underwater wall confining, for example, a canal or stream or to a pole planted in a river/tidal estuary bottom).

FIG. 14E may show a top view of an arrangement of two MHK turbines mounted together, for example, on a pole or surrounding a bridge piling or dock piling whereby if the water flow is from left to right, then, the top (or left) turbine generates power and if the water flow is from right to left, then, the bottom (or right) turbine generates power. A lip at the tip of hatch (not shown), for example, may control the two Hatches of the two MHK turbines so that they are open or closed in synch with a tidal direction change. FIG. 14C shows a similar side view of a side-by-side arrangement of first and second turbines (one hatch open) and (the other hatch closed) for receiving reversing tidal flow in a tidal estuary. Turbines shown in FIGS. 14F(1) and 14F(2) may be vertical axis wind turbines (VAWT). We now turn to a discussion of wind turbines using similar components as are used in marine hydrokinetic turbines.

FIG. 15A shows a side view of a horizontal axis wind turbine (HAWT) swivel-mounted to a central axis of the wind turbine having a wind vane or tail at one end and the propeller/rotor blades at the left or front end so that the wind may change direction and the facing of the wind turbine into the wind consistently turns a propeller/rotor blades (not shown). FIG. 15A shows the components shown in FIG. 15B (magnetic gearbox), mechanical rotary frequency converter (FIG. 15C(1) or 15C(2)); and VT&PG (FIG. 15D). FIG. 15B shows a section view of a magnetic gear of a magnetic gearbox connected to a propeller for handling strong gusts of winds without breaking the magnetic gears of the gearbox. A variable to constant speed converter of the Goldfinch or Hummingbird variety are represented by FIG. 15C(1) or 15C(2) (simplified Hummingbird). The principles of application of a VT&PG for constant speed control are represented by FIG. 15D. The result of combining these components is a reliable, scalable and more efficient wind turbine than those known in the prior art and produces more electricity with greater reliability than the prior art over a greater range of cut-in speed and cut-out wind speed. The magnetic gearbox, if used, may intentionally slip, but the magnetic gears of the magnetic gearbox catch again when a gust of wind or great flow of water decreases back to a more typical speed and predetermined level of torque (certainly preferable to having mechanical gears lose their teeth). Now, components of an example of a Vertical Axis Wind Turbine (VAWT) will be described with reference to FIGS. 16 and 17.

One MHK turbine design with a vane has the advantage of a vertical axis (FIG. 16A(2)) which can move components to match the flow of water. This is not to say that one MHK will not enjoy the principles of the present invention and this MHK with a vane is used by way of example. Components of the present invention comprise, per FIG. 16C, a magnetic gear of a magnetic gearbox that may be much more reliable for connecting a waterwheel to other components of the turbine. The magnetic gear protects the turbine from strong currents of water (gusts of wind) that can develop in an instant or otherwise overwhelm and break a mechanical gearbox intended to transfer propeller/waterwheel energy to a shaft for driving a generator via, typically, an electronic speed converter which is also prone to failure. Next are shown a Goldfinch FIG. 16B(1) mechanical variable to constant speed converter and a simplified Hummingbird FIG. 16B(2) variable to constant speed converter for converting variable water/wind speed to constant speed. As will be described with reference to FIG. 16D and FIG. 17, a variable torque and power generator (VT&PG) may operate at low cut-in wind or water flow speeds so that a propeller (or rotor) may turn with a low cut-in wind/water speed and generate electric energy and may also operate at high wind/water speeds in a mode when the rotor and stator overlap and develop high torque for operation at high wind/water speeds. Thus, by simply checking/sensing the wind/water speed, the VT&PG may be controlled to operate at low cut-in speeds and/or operate at a higher and maximum cut-out speed as seen in FIG. 17 showing two wind/water speeds, cut-in and cut-out.

FIG. 17 shows more wind energy harnessed with Variable Torque and Power Generator (VT&PG). For harnessing renewable energy, there are two specific functions: converting variable input to constant electricity with a Hummingbird and harnessing more electricity with a VT&PG. Harnessing more electricity with a VT&PG is shown in FIGS. 13B and 13C. When the wind speed is slow or low, by minimizing the overlap as shown in FIG. 13B, the torque will be lowered and so the cut-in speed can be lowered and harness more of low speed wind energy. When the wind speed increases, for example, beyond the rated speed for a turbine with a maximum rotor/stator overlap or a FT&PG as shown in FIG. 13C, the power rating will be increased beyond the rating of a small FT&PG 1300 and the VT&PG 1361 will harness much more electricity. The increased amount of harnessed electricity, as shown a strip on the right side of the harnessed energy, is significantly more than a turbine with a fixed torque and power generator (FT&PG 1300). We now turn again to MHK turbines in FIG. 18, a layout of Sample #3. The same principle may be applied to MHK turbines and harness more energy.

Referring to FIG. 18, FIG. 18 provides a cut-away view of a harnessing module 1810 comprising a waterwheel and hatch (the waterwheel having an input shaft 302 and a C&G module 1820 comprising a rotary frequency converter 1830 and VT&PG 1850 for control of variable speed input via a Hummingbird including a constant speed motor (control motor 1840, which may be AC or DC) to control a frequency and develop variable current electric generator output at constant frequency and voltage (but variable current or power as per, for example, FIG. 17) via a Hummingbird rotary frequency converter.

Applications of a Hummingbird mechanical (rotary) frequency converter include converting variable input to constant output (VICO) for harnessing renewable energy; variable input, variable output (VIVO) for automotive transmissions; constant input, variable output (CIVO) for an electric vehicle transmission with a constant speed motor; and constant input, constant output (CICO) for ratio changes for a constant speed input. VICO may be used for harnessing renewable energy or as a frequency converter with a rotary (rotational velocity) input. VIVO may be used in transmissions and for an infinitely variable transmission (IVT). CIVO may be used in an IVT with a constant speed motor input. CIVO may be used as a ratio changer where the constant input and outputs are ratios of one another.

FIGS. 19-22 provide various options for powering the constant speed control motor 1840 of FIG. 18.

FIG. 19 shows a grid power option 1900: using the electric grid power 1920 for powering the constant speed AC motor 1930 used in a Hummingbird mechanical frequency converter. FIG. 19 suggests using grid power 1920 from a grid if available. The power consumed by the constant speed control motor 1930 should be less than the power generated. In Sample #3, the rated power of the generator is about ten times larger than the power used by the constant speed control motor 1930 so a maximum ratio of generated power of VT&PG 1945 versus motor power needs to be defined. FIGS. 20-22 suggest various options when grid power is not available. We do not use grid power but rather use an auxiliary system due to un-available grid power, for example, to power a remote village without a grid connection.

FIG. 20 shows an option #1 2000 for an electric grid-less situation and suggests using generated output power from the MHK or wind turbine and avoiding use of grid power. Shaft 302 couples input 1915 to output 1940 via control input 1935. When the control input 2050 is zero, the output 1940 also will be zero. This system is braking carriers 2010 and 2020 until the generated power of power supply 2030 reaches the required constant frequency and voltage.

FIG. 21 is similar but shows an automatic control. Input shaft 302 is extended and gear 2120 is attached as an additional gear. Input gear 2120 rotates Sprag gear 2125 (cross-hatched) imbedded with Sprag 2126 (cross-hatching similar to input 302) through direction change gear 2121 and Sprag 2126 rotates race 2130 (similar cross-hatching to Sprag 2125) that is an integral part of output shaft 2135 to VT&PG 1945. When the VT&PG generator 1945 provides a required voltage to power supply 2030, control AC motor 2050 will be powered. When the control motor 2050 is powered, the output controlled by the control input or Sprag gear 2115 may rotate faster than the Sprag gear 2125 and the input through input gear 2120 will be by-passed. While the control motor 2050 is not powered, the output gear 2110 will not be rotating, but the Sprag 2116 allows the Sprag gear 2115 to free wheel. The direction control gear 2121 make both Sprag gears 2115 and 2125 rotate in the same direction.

A CPU may be used for an automatic operation of powering the MHK or wind turbine control motor 2050 when grid power is not available. When control motor 2050 is powered, control motor input 1935 produces required output to VT&PG 1945 through output gear 2110, Sprag gear 2115, Sprag 2116, race 2130, and output shaft 2135.

FIGS. 21 and 22 describes option #2 2100 and #3 2200 for an electric grid-less situation and suggests powering the control motor 2050, 2250 using auxiliary power. For example, FIG. 22 using an alternator or DC generator 2220 for charging a battery 2240 controlled by a charge controller 2230 and a DC motor 2250 is connected between the charge controller 2230 and the battery 2240 as is used for a battery charging station. A dummy load may be added (not shown) as necessary. Then, the output power will reach the rated power and the control motor 2250 powered. FIG. 21 on the other hand uses Sprags, carriers and an AC motor 2050 and the CPU must decide the state of the Sprags and carriers. An electronic circuit may be used to maintain a minimum power range for control motor operation. A separate waterwheel/rotor blade may be used for auxiliary system operation. Power used by the control motor (AC or DC 2050, 2250) may then be independent of the power generated by the main electricity generator (VT&PG 1945). A power supply may be needed or a variable speed generator or alternator may be used alternatively (as would be known in the art) to develop power for the respective control motor 2050, 2250.

FIG. 22 describes option #3 2200 for grid-less situation and suggests powering without using grid power, for example, using an alternator or a DC generator 2220 to charge controller 2230 for battery 2240 to power DC motor 2250. When the system is installed initially, the input 1915 starts generating DC and battery 2240 will be charged. While the battery is being charged, DC motor 2250 will not rotate and, therefore, control input 1935, output gear 1940, and VT&PG 1945 will not rotate. When the battery is fully charged, DC motor 2250 will be powered and starts rotating at a designed constant speed and VT&PG 1945 will generate grid compatible constant frequency electricity. A CPU may be used for an automatic operation of powering the MHK or wind turbine control motor 2250 when grid power is not available. When control motor 2250 is powered, control motor input 1935 produces required output to VT&PG 1945. AC power supply was used in FIGS. 20 and 21, and DC power was used in FIG. 22 but either system can be used as required.

The principles of application of the several discussed embodiments of a structure and method of constructing same for, for example, providing a green energy alternative to the burning of fuel such as coal, oil or other less environmentally friendly energy sources have been demonstrated above using a spur/helical gear assembly of sun gears and planetary gears and a VT&PG control assembly, for example, in a wind or MHK turbine electric power generator. The present embodiments used in conjunction with known flow energy turbine systems may be enhanced by using many known control systems for improved operation such as pitch and yaw control in wind turbines, control responsive to power grid statistics and requirements and remote or automatic control responsive to predicted and actual weather conditions (wind velocity from an anemometer, water flow velocity from a water flow velocity meter, barometric reading and direction (rising or falling) and the like). A three variable to constant speed converter may be of the Goldfinch or Hummingbird type and include a constant speed motor for controlling the output speed at a constant along with use of a variable power generator in these embodiments. These and other features of embodiments and aspects of a variable flow input, constant output system and method may come to mind from reading the above detailed description, and any claimed invention should be only deemed limited by the scope of the claims to follow. Moreover, the Abstract should not be considered limiting. Any patent applications, issued patents and citations to published articles mentioned herein should be considered incorporated by reference herein in their entirety.

What I claim is:

1. A marine hydrokinetic electric or wind power generator comprising
   a gearbox coupled to one of a propeller shaft and a waterwheel shaft, the gearbox comprising magnetic gears for slipping in the event of one of withstanding bursts of wind and water flow energy,
   a mechanical rotary frequency converter comprising three variables, responsive to one of a waterwheel shaft rotation and a propeller rotation shaft, the mechanical rotary frequency converter comprising at least one spur/helical gear assembly having equally spaced sets of planetary gears of a carrier and surrounding at least one sun gear integral with or attached to a shaft of the mechanical rotary frequency converter,
   a variable torque and power generator coupled to the mechanical rotary frequency converter and to an output shaft, the variable torque and power generator comprising a rotor and a stator axially adjustable along the output shaft so that the rotor may be displaced with respect to the stator or the stator may be displaced with respect to the rotor, the variable torque and power generator with a minimum displacement and complete overlap of rotor and stator and a maximum torque value in one position and with a maximum displacement and relative non-overlap of rotor and stator and a minimum torque value in another position,
   an input shaft of one of a propeller shaft and a waterwheel shaft for rotating at a rotational velocity depending on one of wind speed and water flow rate and an output shaft for rotating at a different constant rotational velocity, and
   an electric generator, responsive to the variable torque and power generator for generating electricity at constant frequency and voltage but variable current.

2. The marine hydrokinetic electric or wind power generator of claim 1 further comprising a river flow or wind speed sensor for actuating operation of the variable torque and power generator.

3. The marine hydrokinetic electric or wind power generator of claim 2 further comprising a constant speed motor for controlling the electric generator speed.

4. The marine hydrokinetic electric or wind power generator of claim 1 further comprising a servo motor for adjusting the position of the stator with respect to the rotor of the variable torque and power generator, the rotor being integral with or connected to an output shaft coupled to the electric generator.

5. The marine hydrokinetic electric or wind power generator of claim 3 wherein the stator outputs a higher value of electric power than a conventional marine hydrokinetic or river turbine given the same amount of input water flow or wind velocity.

6. The marine hydrokinetic or wind power generator of claim 2 wherein the sensor comprises a sensor of phase angle, the adjustable assembly of rotor and stator of the variable torque and power generator further comprising a worm and worm gear assembly for controlling the axial relationship between the rotor and the stator.

7. The marine hydrokinetic electric or wind power generator of claim 2 wherein the sensor comprises a sensor of one of input shaft and output shaft rotational velocity and the sensor providing an output to control hatch position with respect to a waterwheel of a marine hydrokinetic turbine or propeller pitch angle of a wind turbine and the sensor providing an output for controlling the variable torque and power generator output to a relatively constant frequency and voltage.

8. The marine hydrokinetic electric or wind power generator as recited in claim 1 wherein an input shaft is coupled to the rotor of the variable torque and power generator, the rotor being integral with or connected to one of the input shaft and an output shaft of the electric generator of one of a marine hydrokinetic or wind turbine.

9. The marine hydrokinetic or wind power generator as recited in claim 1, an input shaft coupled to the rotor of the variable torque and power generator, the rotor being integral with or connected to one of the input shaft and an output shaft of a marine hydrokinetic turbine for driving the electric power generator at constant rotational velocity.

10. The marine hydrokinetic or wind power generator as recited in claim 1 wherein the variable torque and power generator comprises the rotor and the stator, the stator being moveable axially with respect to the rotor and the rotor is integral with or connected to the shaft of the variable torque and power generator of the marine hydrokinetic or wind power generator and the variable torque and power generator is coupled to an output shaft of first and second gear assemblies of the mechanical rotary frequency converter.

11. The marine hydrokinetic or wind power generator as recited in claim 10, the mechanical rotary frequency converter comprising a dual spur/helical gear assembly speed converter, the dual spur/helical gear assembly able to be reduced in part count and size to one of a three gear width, a two gear width and a single gear width spur/helical gear assembly having three variables.

12. The marine hydrokinetic or wind power generator as recited in claim 10, the mechanical rotary frequency converter further comprising a three variable spur/helical gear assembly having a constant speed motor control input.

13. The marine hydrokinetic or wind power generator as recited in claim 1 further comprising:
a gearbox coupled to one of the propeller shaft and the waterwheel shaft, the gearbox comprising magnetic gears for slipping when a predetermined value of torque is exceeded in the event of one of bursts of wind and water flow.

14. A marine hydrokinetic or wind electric power generator, the electric power generator having a shaft integral with or attached to a rotor of a variable torque and power generator further comprising a stator axially surrounding the rotor and axially displaceable with respect to the rotor by a motor, an electronic control comprising a program controlled computer processor having a memory, the electronic control for receiving a rotational velocity measure of the electric generator shaft and for determining a desired position of the stator with respect to the rotor for constant power output frequency with respect to a variable input shaft rotational velocity, the electric power generator for outputting a constant electric voltage at a constant frequency.

15. The marine hydrokinetic electric power generator of claim 14 adaptable for use in a wind turbine for regulating variable wind velocity with respect to constant desired electric power output frequency.

16. The marine hydrokinetic or wind power generator of claim 14 further comprising an input shaft coupled to the generator shaft through a magnetic gear gearbox, having magnetic gears which slip in the presence of high wind gusts or large bursts of water energy until a predetermined value of torque between magnetic gears is reached.

17. The marine hydrokinetic or wind power generator of claim 14 wherein the generator has a displacement control assembly comprising a servo motor, a worm and worm gear for adjusting the stator axial position with respect to the rotor.

18. A spur/helical planetary gear assembly controlled marine hydrokinetic or wind power generator, the marine hydrokinetic or wind power generator having an input shaft for driving a second shaft surrounded by first and second sleeves and first and second sun gears integral with or attached to the first and second sleeves respectively, a variable torque and power generator further comprising a stator axially moveable with respect to a rotor, the rotor coupled to the shaft, a spur/helical planetary gear assembly comprising a mechanical rotary frequency converter adjusting the stator with respect to the rotor of the variable torque and power generator for providing a constant output current frequency to an electricity generator.

19. The spur/helical planetary gear assembly controlled marine hydrokinetic or wind power generator of claim 18 wherein the marine hydrokinetic or wind power generator is coupled to a second gear attached to or integral with the first sleeve surrounding the second shaft, the second gear for meshing with a gear of the variable torque and power generator.

20. The spur/helical planetary gear assembly controlled marine hydrokinetic or wind power generator of claim 18 wherein the spur/helical planetary gear assembly comprises one of greater than or equal to three assignable variables and a plurality of three assignable variable planetary gear sets equally spaced about a shaft, the control variable being provided as an output of a constant speed motor.

\* \* \* \* \*